United States Patent [19]

Van Simaeys et al.

[11] Patent Number: 4,641,301
[45] Date of Patent: Feb. 3, 1987

[54] TELECOMMUNICATION SWITCHING SYSTEM AND PRIORITY ARRANGEMENT USED THEREIN

[75] Inventors: Francoise C. G. Van Simaeys, Brussels; Anna M. C. Leurs, Kessel, both of Belgium; Daniel C. Upp, Southbury, Conn.; Alan J. Lawrence, Stratford, Conn.; John M. Cotton, East Norwalk, Conn.

[73] Assignee: International Standard Electric Corporation, New York, N.Y.

[21] Appl. No.: 701,904

[22] Filed: Feb. 15, 1985

[30] Foreign Application Priority Data

Feb. 21, 1984 [BE] Belgium .................................. 2/60342

[51] Int. Cl.⁴ ........................................... H04Q 11/04
[52] U.S. Cl. .................................................... 370/58
[58] Field of Search ...................... 370/58, 54, 110.1; 179/18 EA, 18 ES; 340/825.51

[56] References Cited

U.S. PATENT DOCUMENTS

| | | | |
|---|---|---|---|
| 4,524,440 | 6/1985 | Orsic | 370/58 |
| 4,538,023 | 8/1985 | Peck et al. | 370/58 |
| 4,558,444 | 12/1985 | Kennedy et al. | 370/58 |

Primary Examiner—Douglas W. Olms
Assistant Examiner—Frank M. Scutch, III
Attorney, Agent, or Firm—Peter C. Van Der Sluys; Robert A. Hays

[57] ABSTRACT

A telecommunication switching system includes a number of control circuits each of which is common to a plurality of line circuits and is coupled through time division multiplex links with two processor controlled interface circuits which are further coupled to a switching network. Line scanning information is processed in the control circuits to reduce the work load of the processor controlled interface circuits. Said line scanning information is then transmitted in the TDM links to the processor controlled interface circuits. The transmission priority among the control circuits is determined by a priority arrangement established for the system. A channel assignment controls the allocation of channels of the TDM links leading to parts of the line circuits.

25 Claims, 20 Drawing Figures

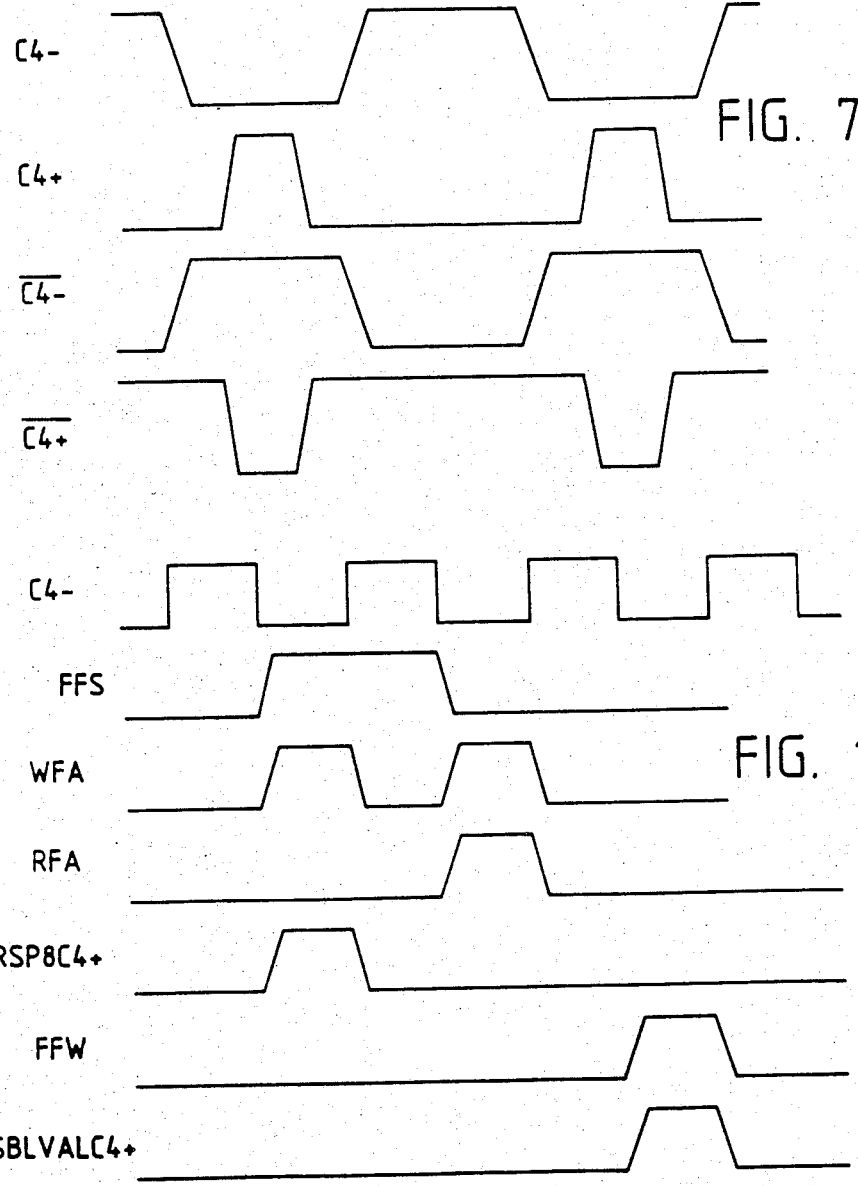

TELECOMMUNICATION SWITCHING SYSTEM AND PRIORITY ARRANGEMENT USED THEREIN

The present invention relates to a telecommunication switching system including a plurality of terminal circuits with a common control circuit coupled through time division multiplex links with a processor controlled interface circuit itself coupled with a switching network, said control circuit being adapted to control said terminal circuits and to exchange control data between said terminal circuits and said interface circuit.

Such a system is already known from Belgian Pat. No. 894 422 U.S. Pat. No. 4,456,991 and more particularly from FIG. 4 thereof and is also described in the article "Technology and techniques in the line circuit of a fully digital switching system" by J. Cotton et al, ISS '81 CIC Montreal, Sept. 21-25, 1981, Session 14B, Paper 3, pages 1-7. In this known system the common control circuit (the line common function circuit) is coupled to the interface circuit via a 13-bit bus of a processor forming part of this circuit and this bus is used for the transmission of control data such as data obtained by scanning the line circuits to the interface circuit for being processed therein by the processor.

A drawback of this known system is the presence of the bus which includes a relatively large number of conductors and therefore requires a like number of terminals on the common control circuit as well as on the interface circuit. Also, in this known system the above scanning data are entirely processed by the processor of the interface circuit which therefore has a relatively high work load.

An object of the present invention is to provide a telecommunication switching system of the above type but which does not present these drawbacks.

According to the invention this object is achieved due to the fact that said common control circuit includes first means adapted to process control data collected from said terminal circuits and second means to transmit the thus processed data to said interface circuit on said time division multiplex links.

By the use of the time division multiplex link for control purposes no additional bus is required between the common control circuit and the interface circuit for transmitting control data and because these data are processed in this common control circuit the work load of the processor in the interface circuit is decreased.

The present invention also relates to a telecommunication switching system including a plurality of terminal circuits with a common control circuit coupled on the one hand via time division multiplex first input and output links and a processor controlled interface circuit with a switching network and on the other hand to individual parts of said terminal circuits via time division multiplex second input and output links, said first and second input and output links having a plurality of first and second input and output time channels respectively.

Such a system is already known from the above mentioned article by J. Cotton.

Another object of the present invention is to provide a telecommunication switching system of the above type, wherein the time delay to which data entering the common control circuit in a first input time channel are subjected before leaving it in a second output time channel is restricted to a minimum.

According to the invention this object is achieved due to the fact that in said common control circuit a plurality of second output time channels is permanently allocated to each of said terminal circuits, and that said common control circuit further includes channel assignment means for assigning to a first input time channel which has previously been assigned to a terminal circuit, the second output time channel of said plurality permanently allocated to said terminal circuit which follows most closely said first input time channel when considered in time.

By this choice, data relating to a terminal circuit and entering the common control circuit in a first input time channel allocated to this terminal circuit can leave this common circuit for the terminal circuit in the assigned second output time channel assigned to this terminal circuit and closely following this first input time channel.

Another characteristic feature of the present invention is that said second output time channels are subdivided in successive groups of m successive channels, the p successive channels of each group being allocated to distinct terminal circuits and in the same order.

Thus these data are subjected to a delay in the common control circuit which is at most slightly larger than a number of channel times equal to the number of terminal circuits. For instance, when the latter number is equal to 16 the maximum delay is equal to 18 channel times, 2 such channel times being due to the fact that the first and second time division multiplex links are not synchronized.

The present invention further also relates to a priority arrangement for a plurality of user circuits having access to a common facility, said priority arrangement being adapted to grant priority to said user circuits, for accessing said common facility, in a predetermined order.

Another object of the present invention is to provide a priority arrangement of the above type wherein the priority of the various user circuits is ensured by means of a minimum control connection between the priority circuits.

According to the invention this object is achieved due to the fact that it includes a plurality of priority circuits associated to respective ones of said user circuits and intercoupled by a time division multiplex link having a plurality of time channels, and that each of said priority circuits is adapted to grant priority to its associated user circuit during a respective one of said time channels and to inform the other priority circuits of this fact by applying a grant priority signal on said link during said one time channel, said grant priority signal preventing said other user circuits from accessing said common facility until it has been accessed by said user circuit having priority.

By providing single wire time division multiplex control link between the priority circuits the priority of the various user circuits is ensured in a simple and rapid way.

The above mentioned and other objects and features of the invention will become more apparent and the invention itself will be best understood by referring to the following description of an embodiment taken in conjunction with the accompanying drawings in which.

Figure 1:
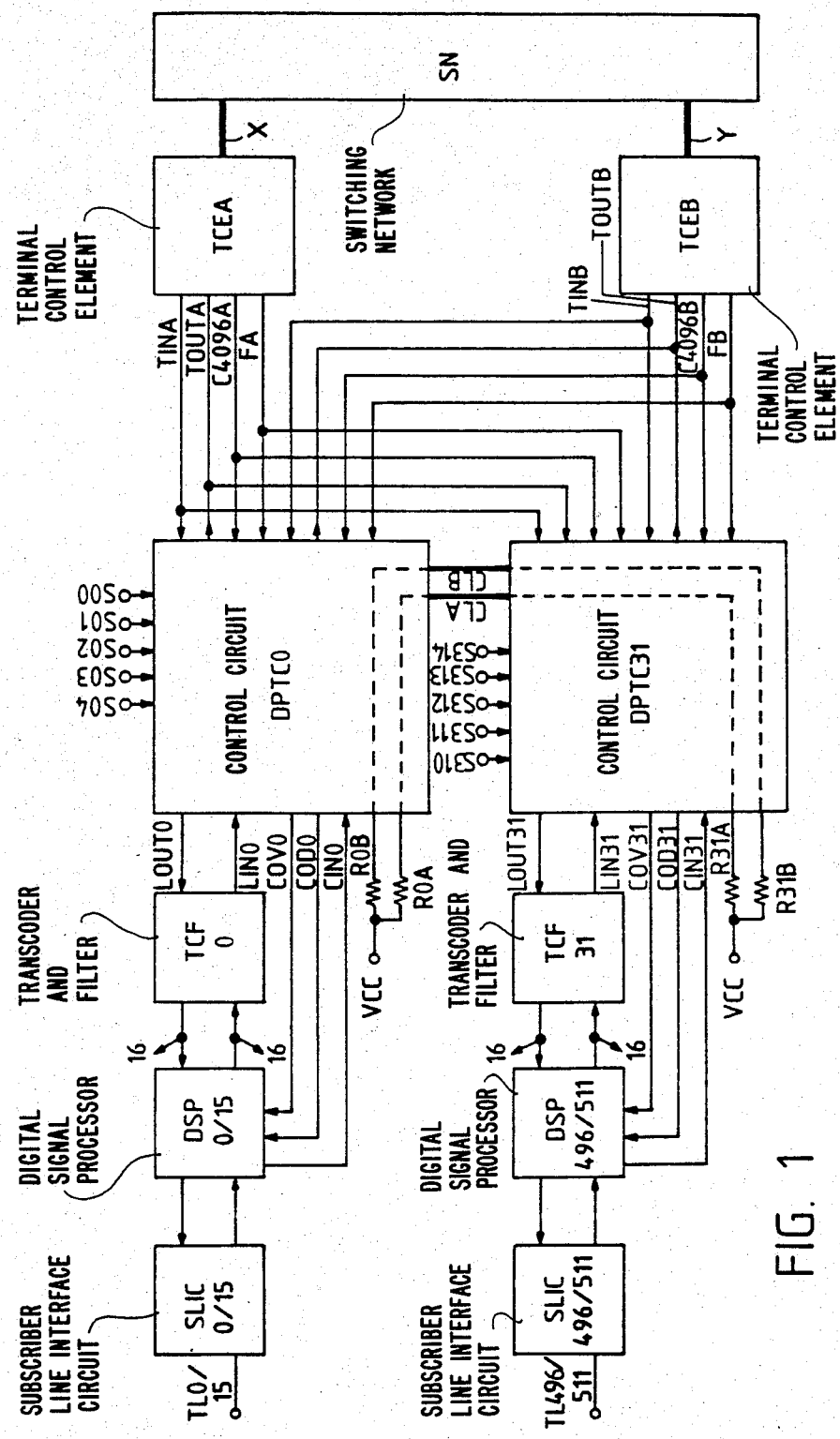
FIG. 1 is a schematic view of a telecommunication switching system according to the invention.
Figure 3:
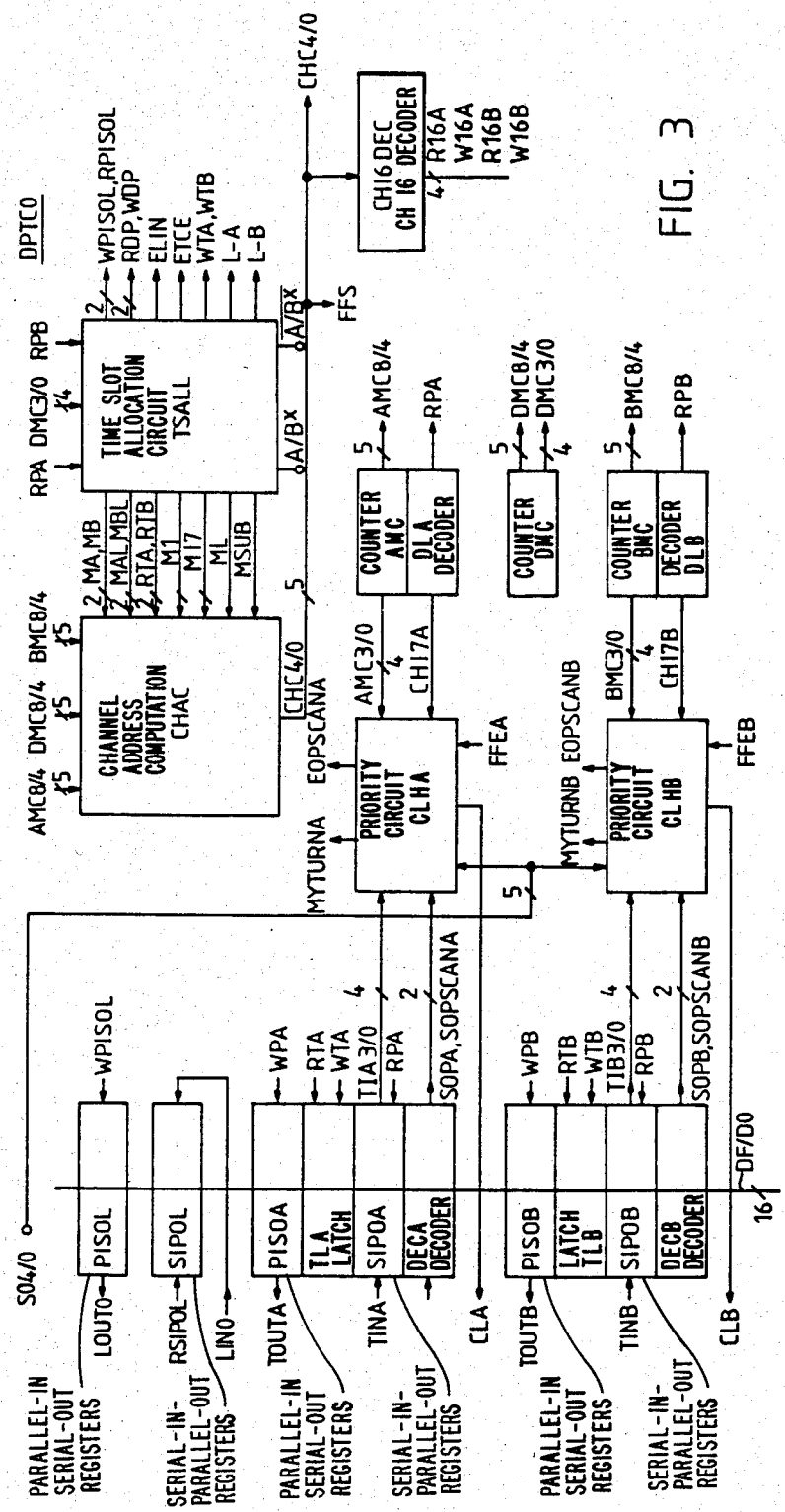
Figure 4:
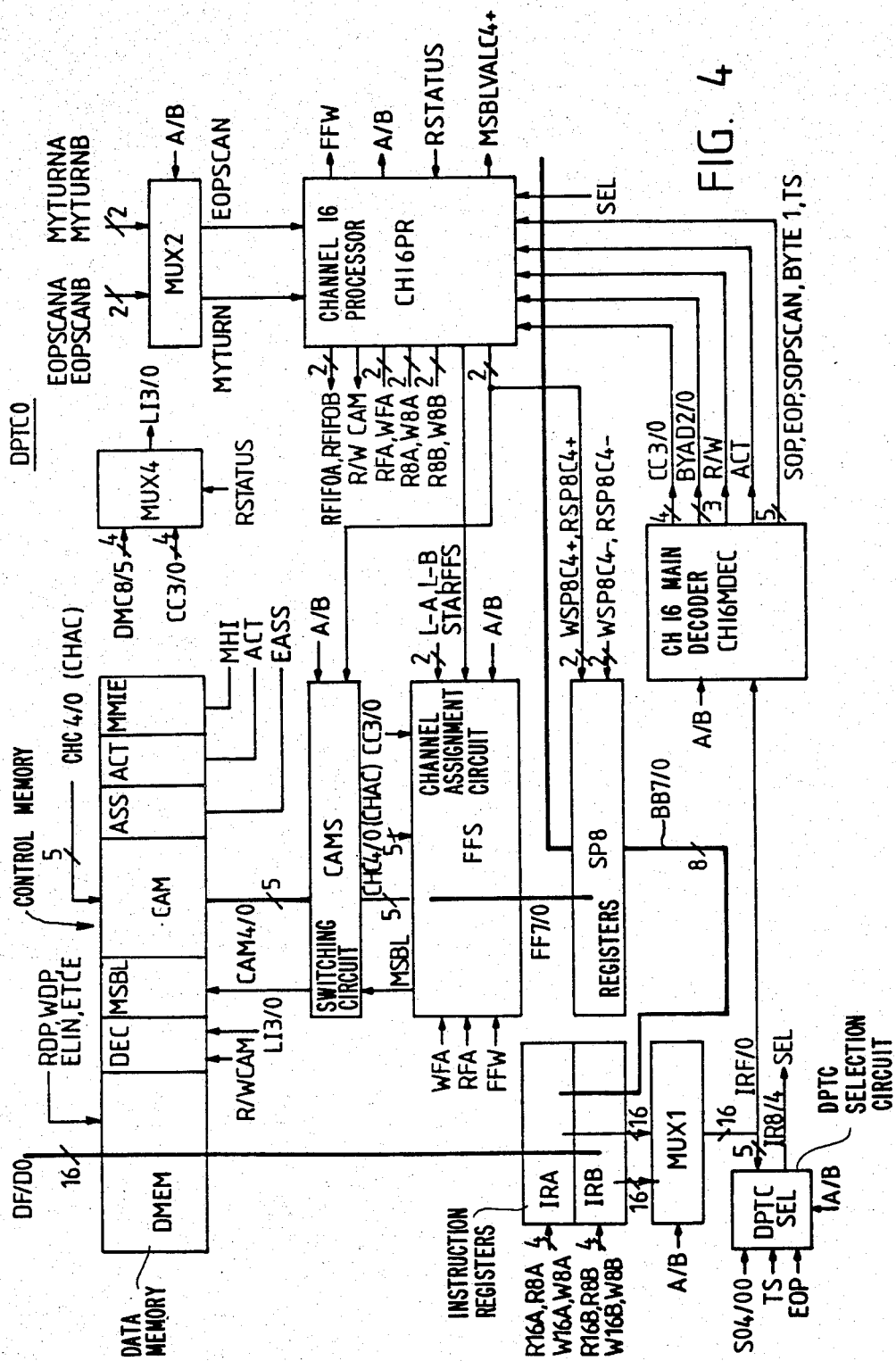
Figure 5:
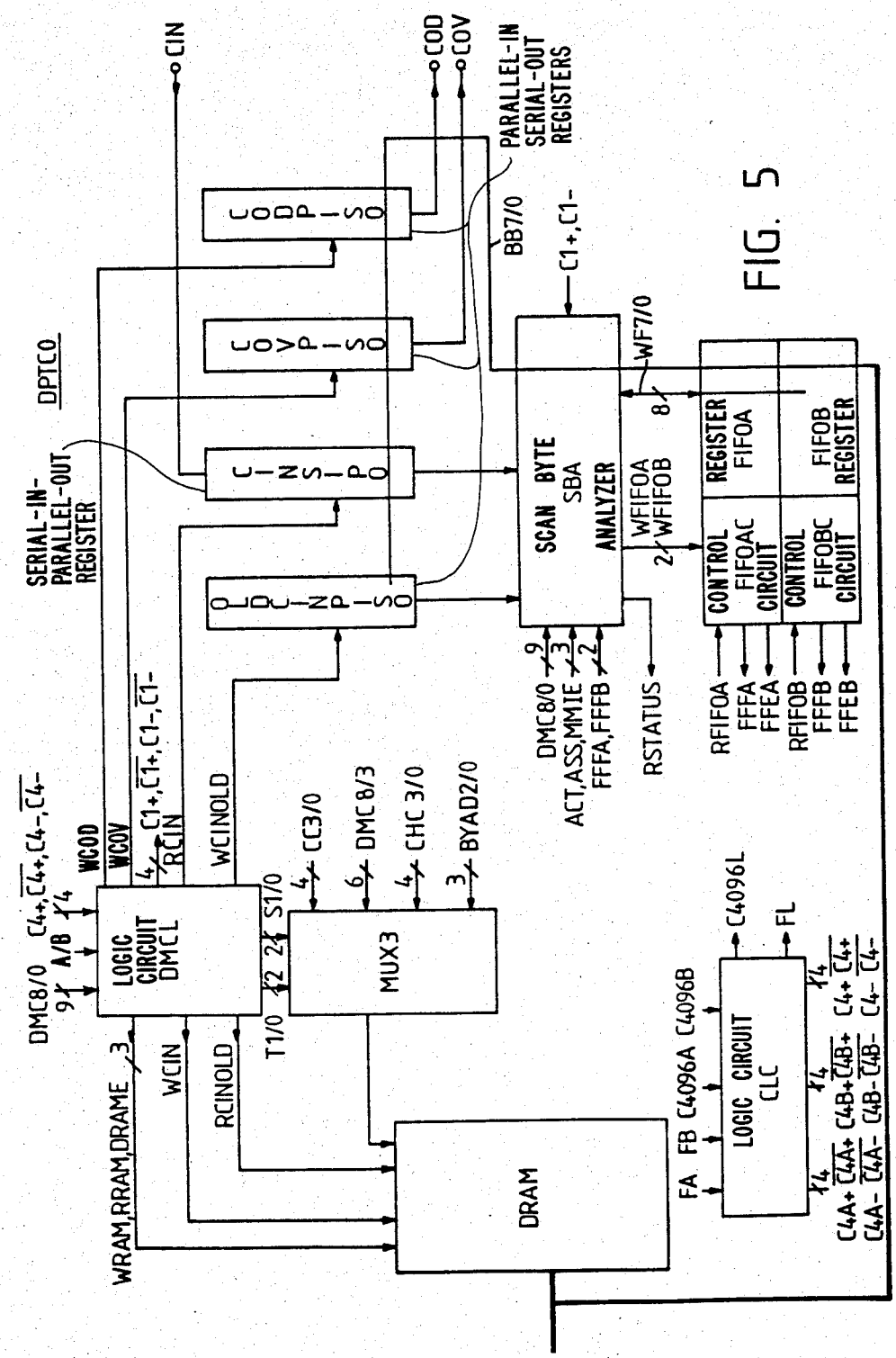
Figure 8:
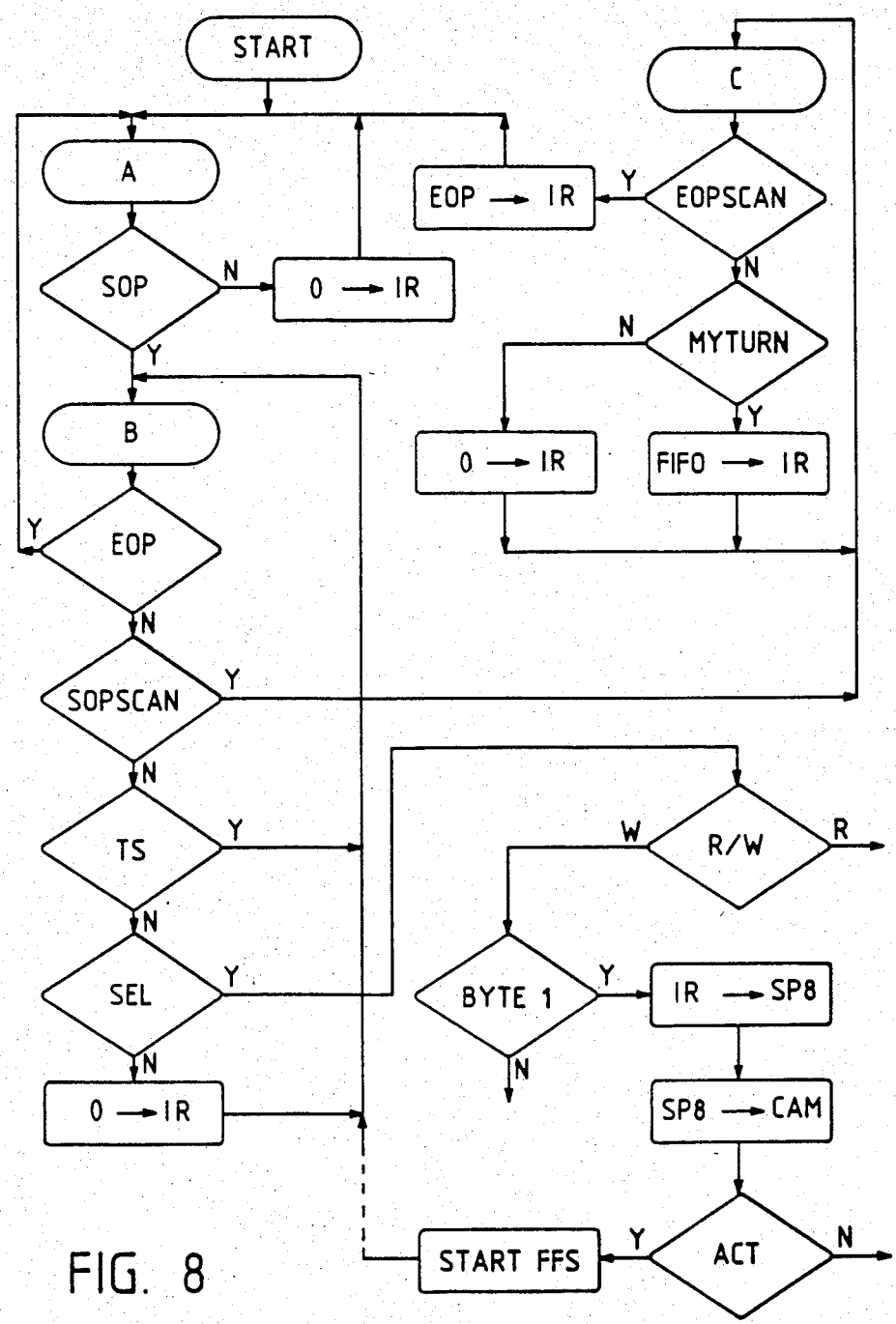
Figure 9:
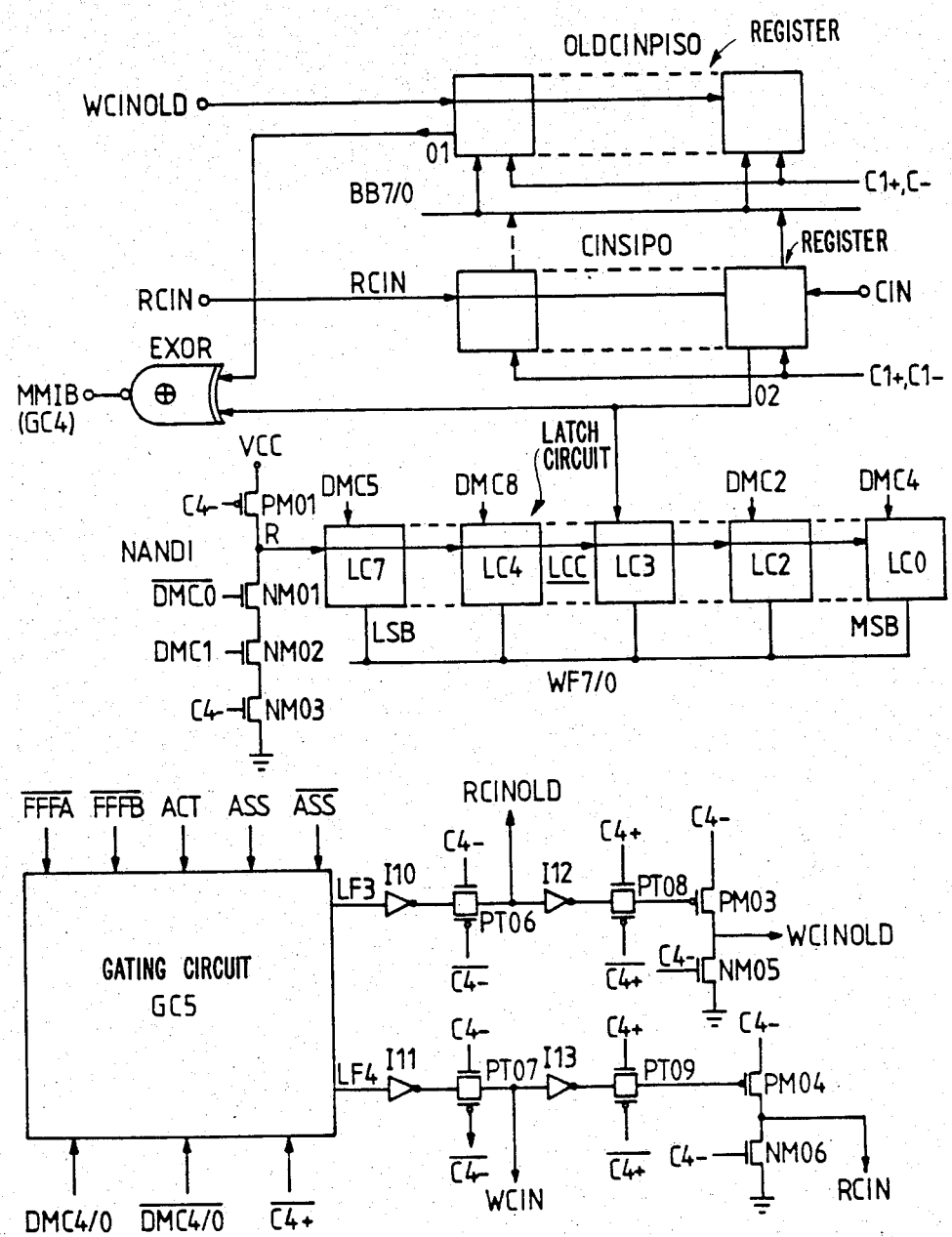
Figure 10:
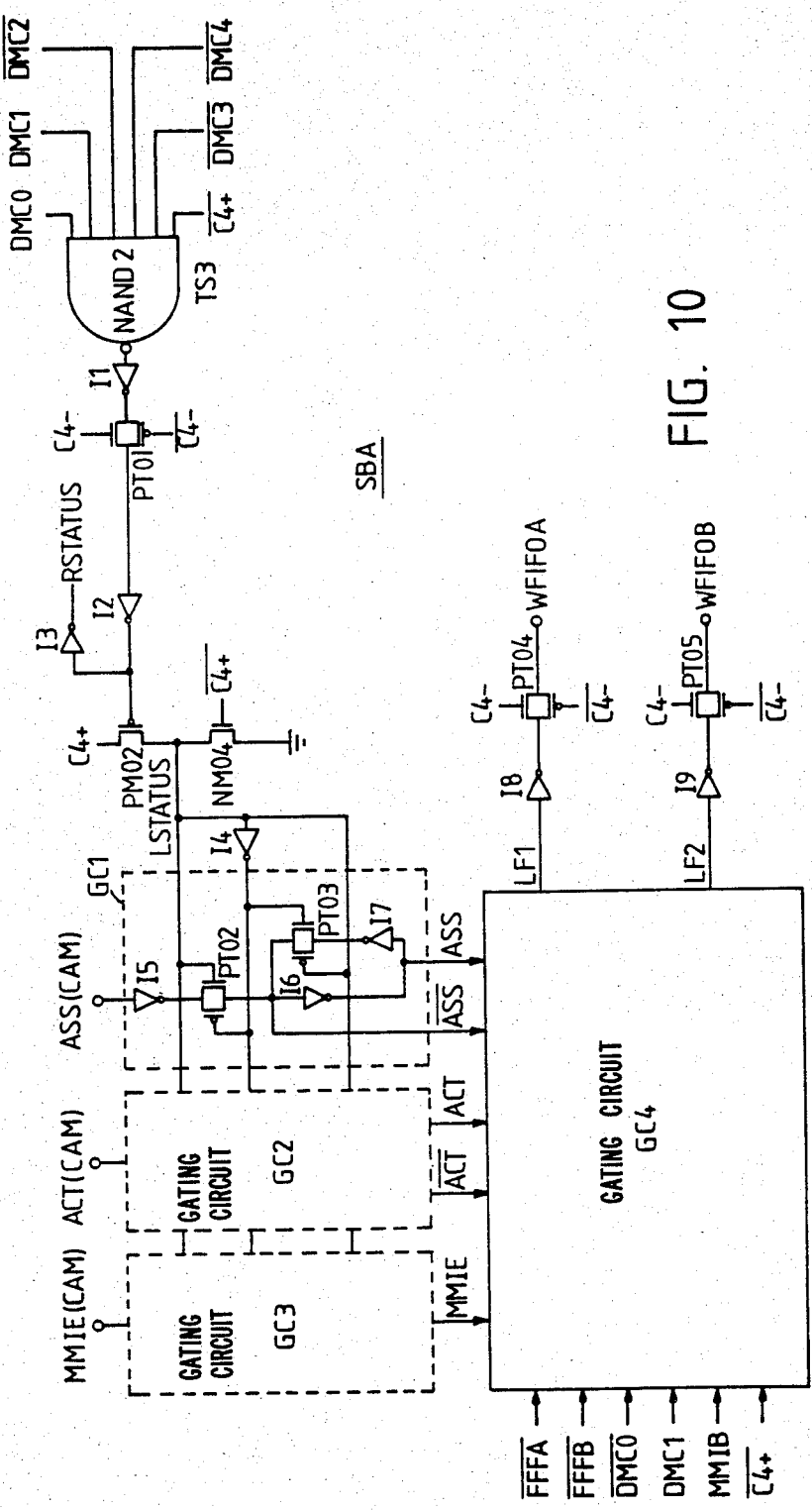
Figure 11:
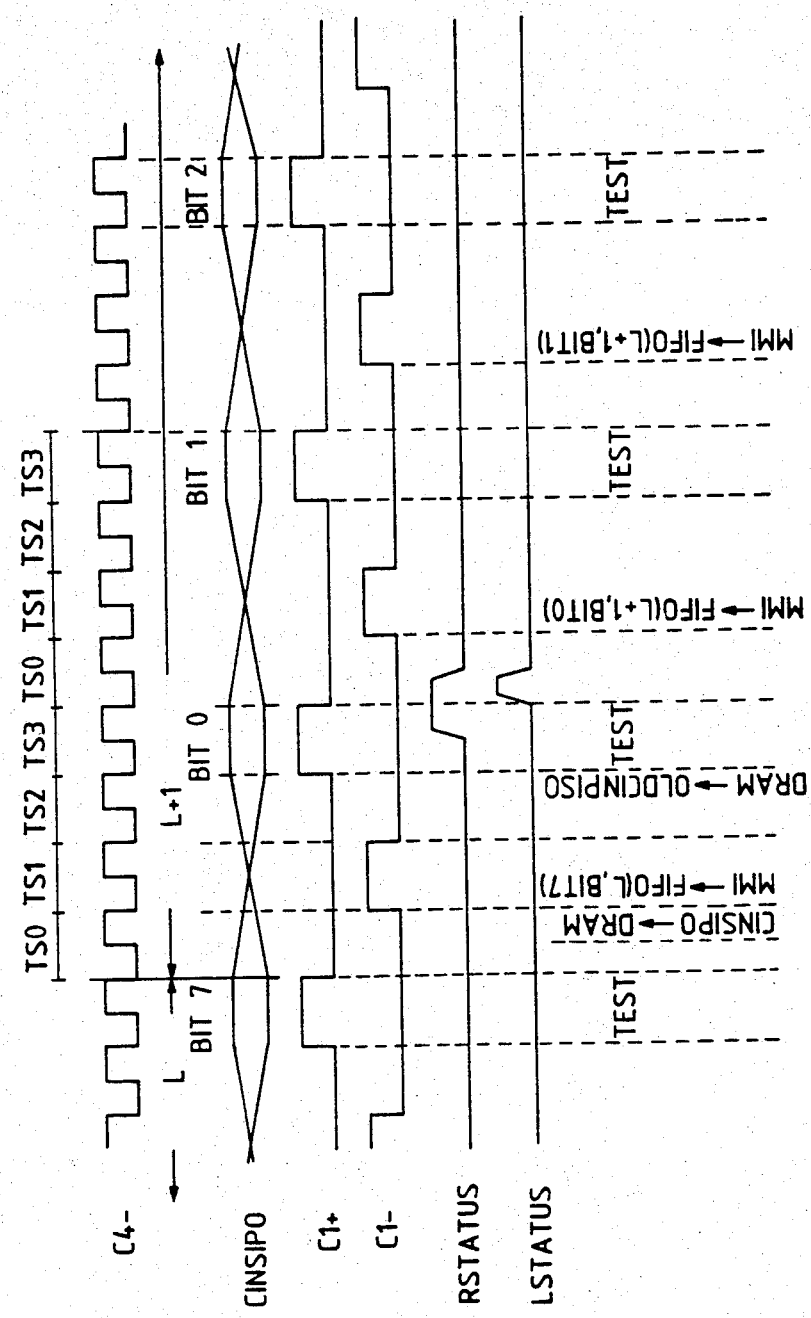
Figure 12:
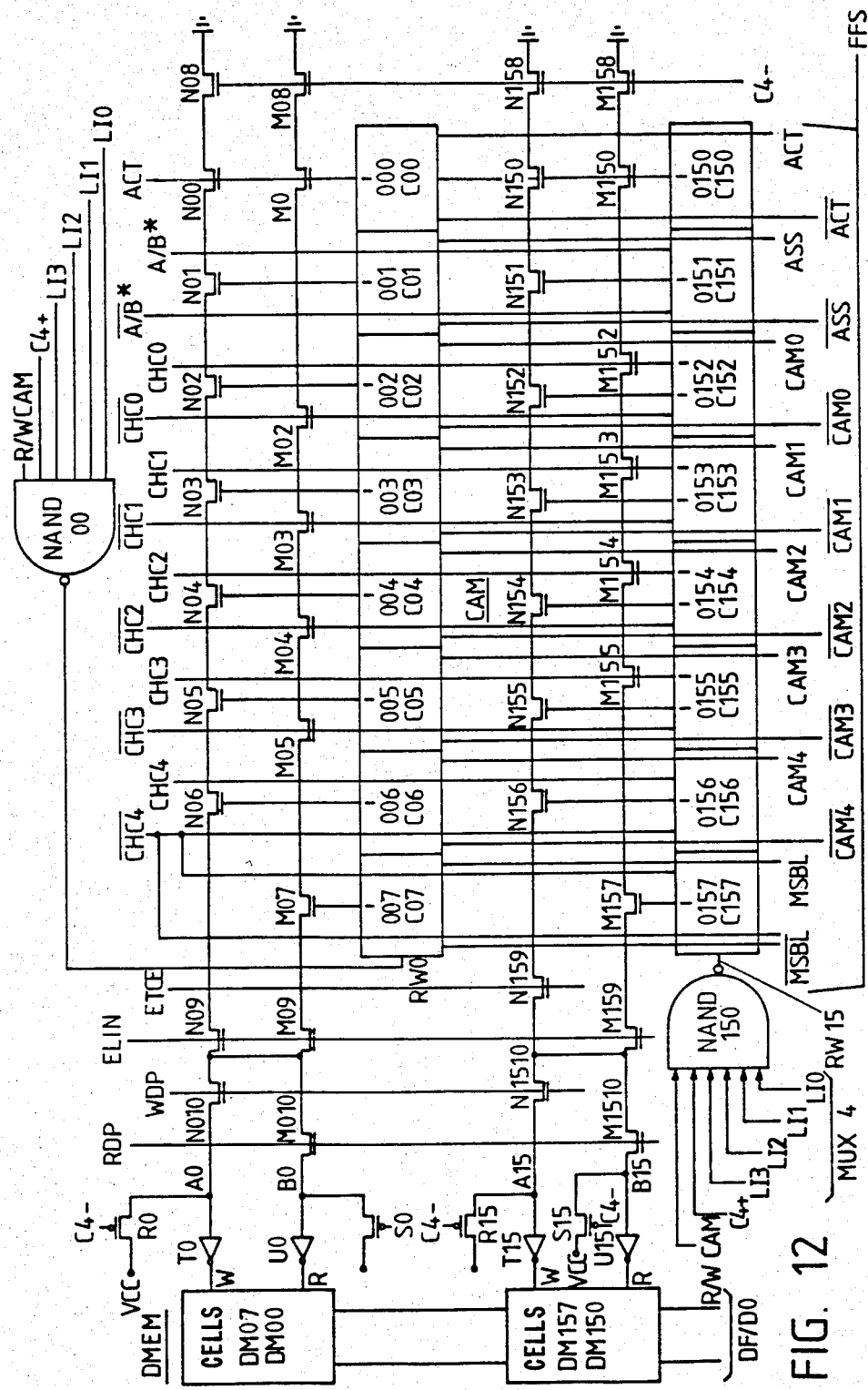
Figure 13:
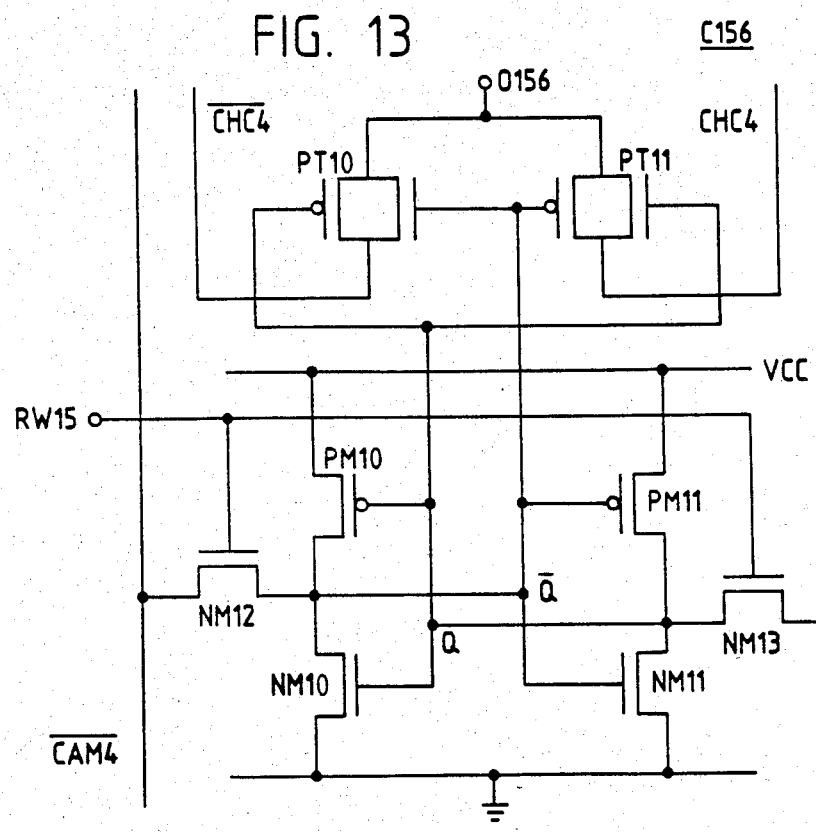
Figure 14:
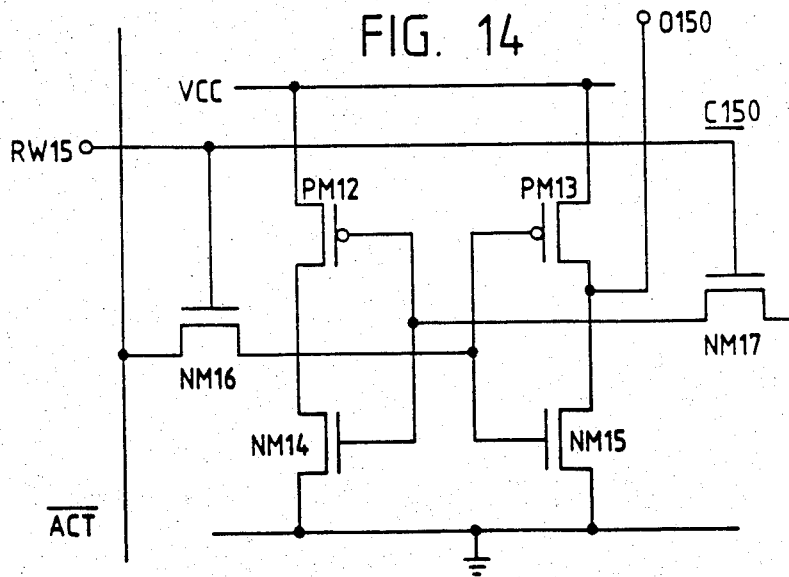
Figure 15:
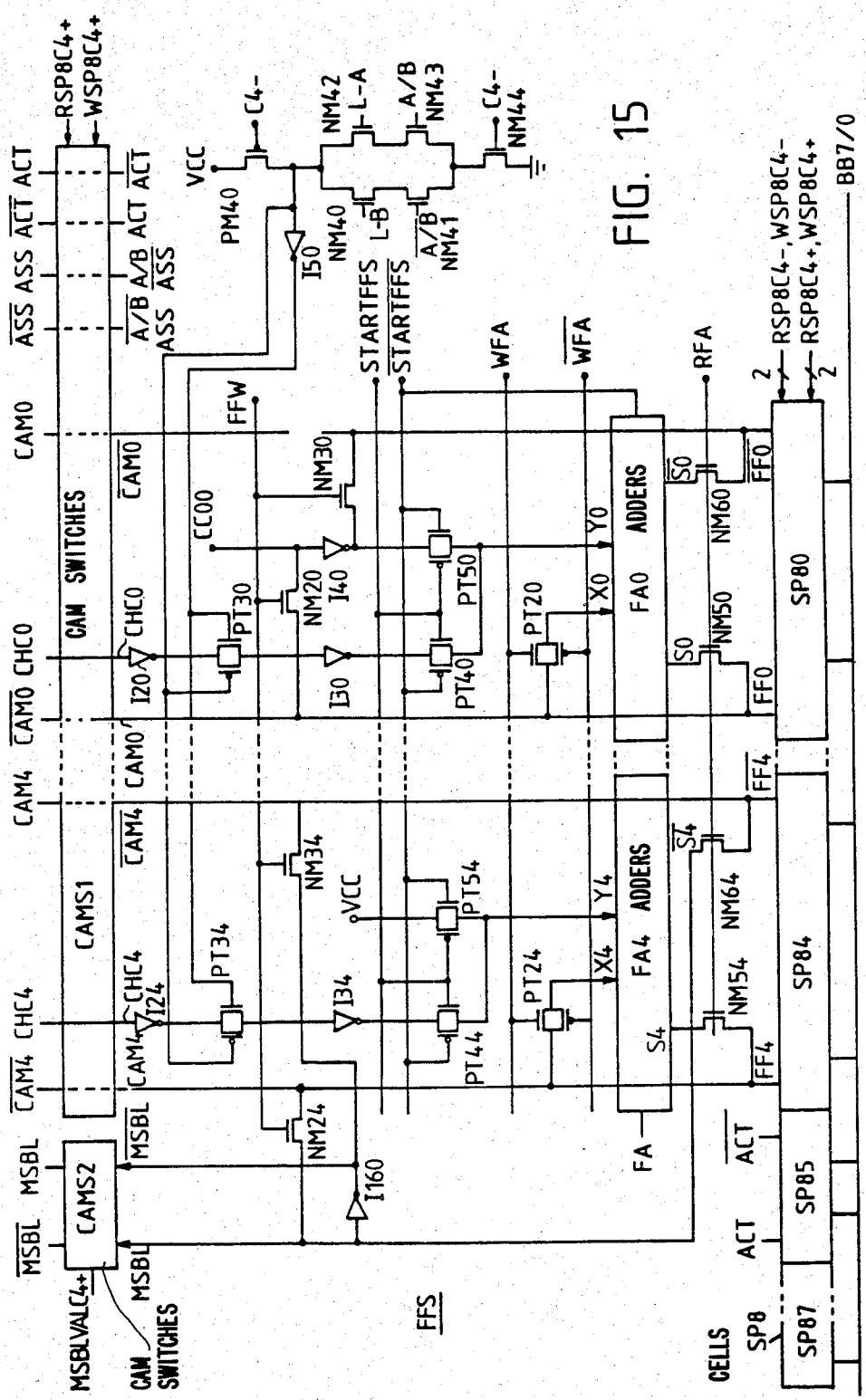
Figure 17:
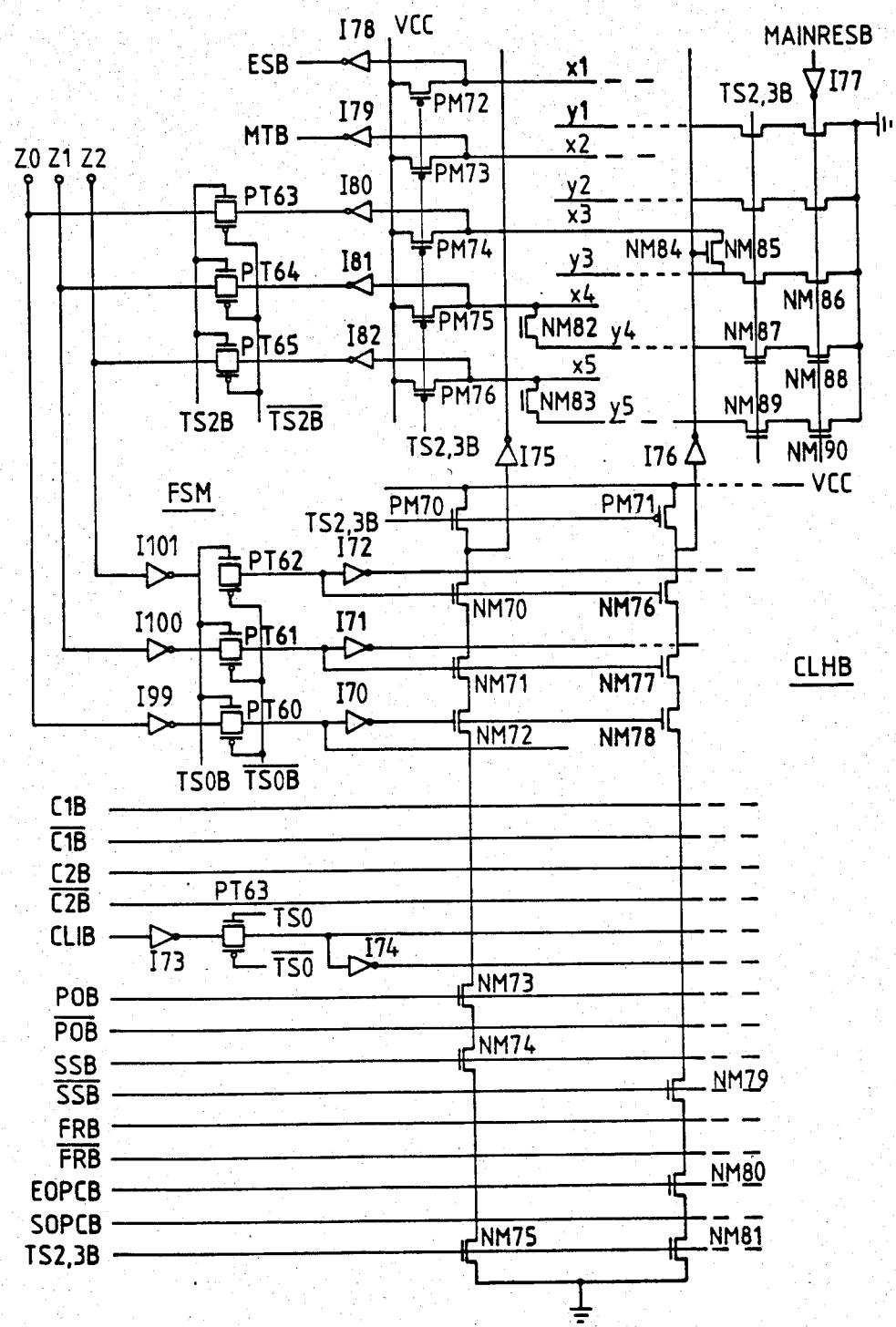
Figure 18:
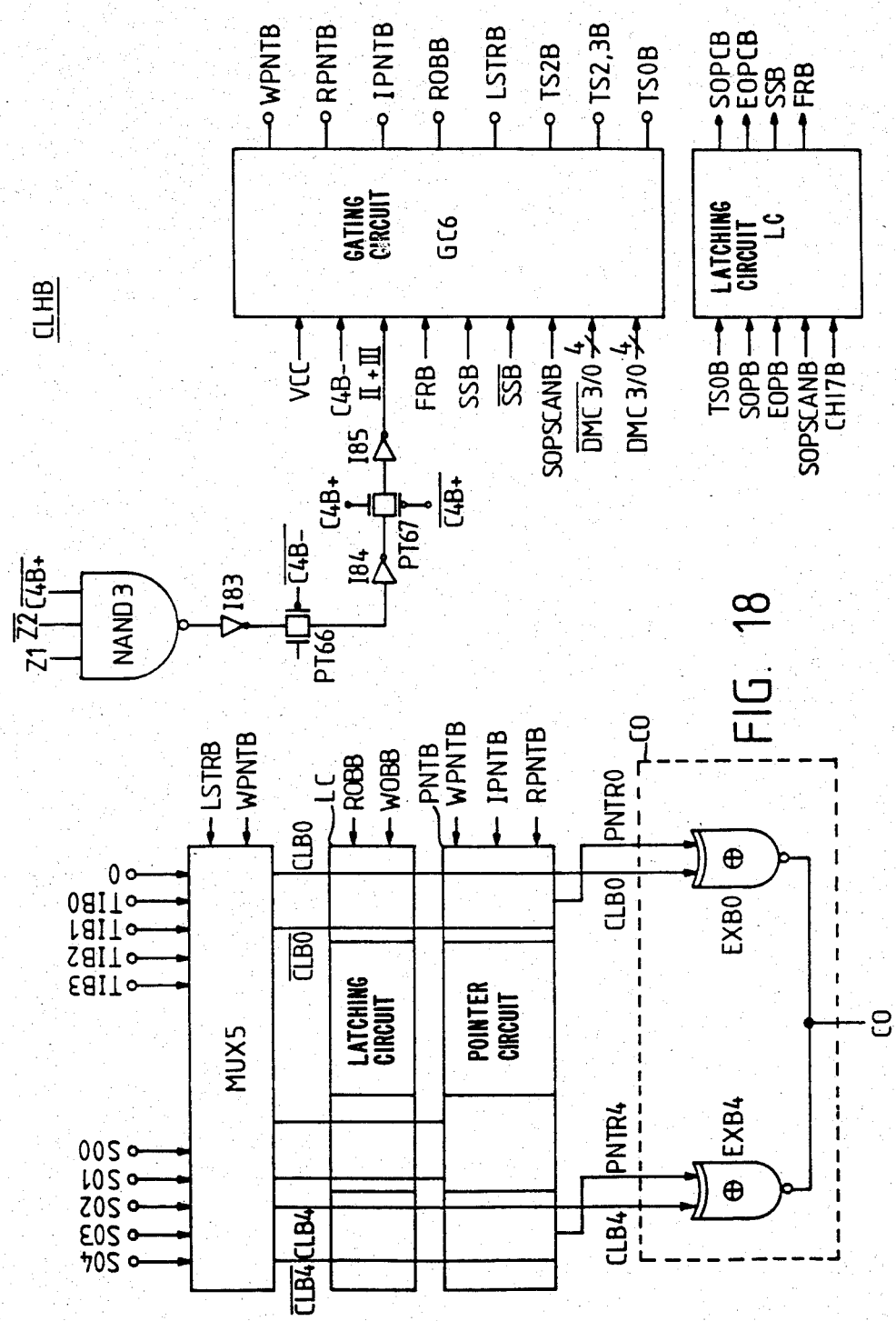
Figure 19:
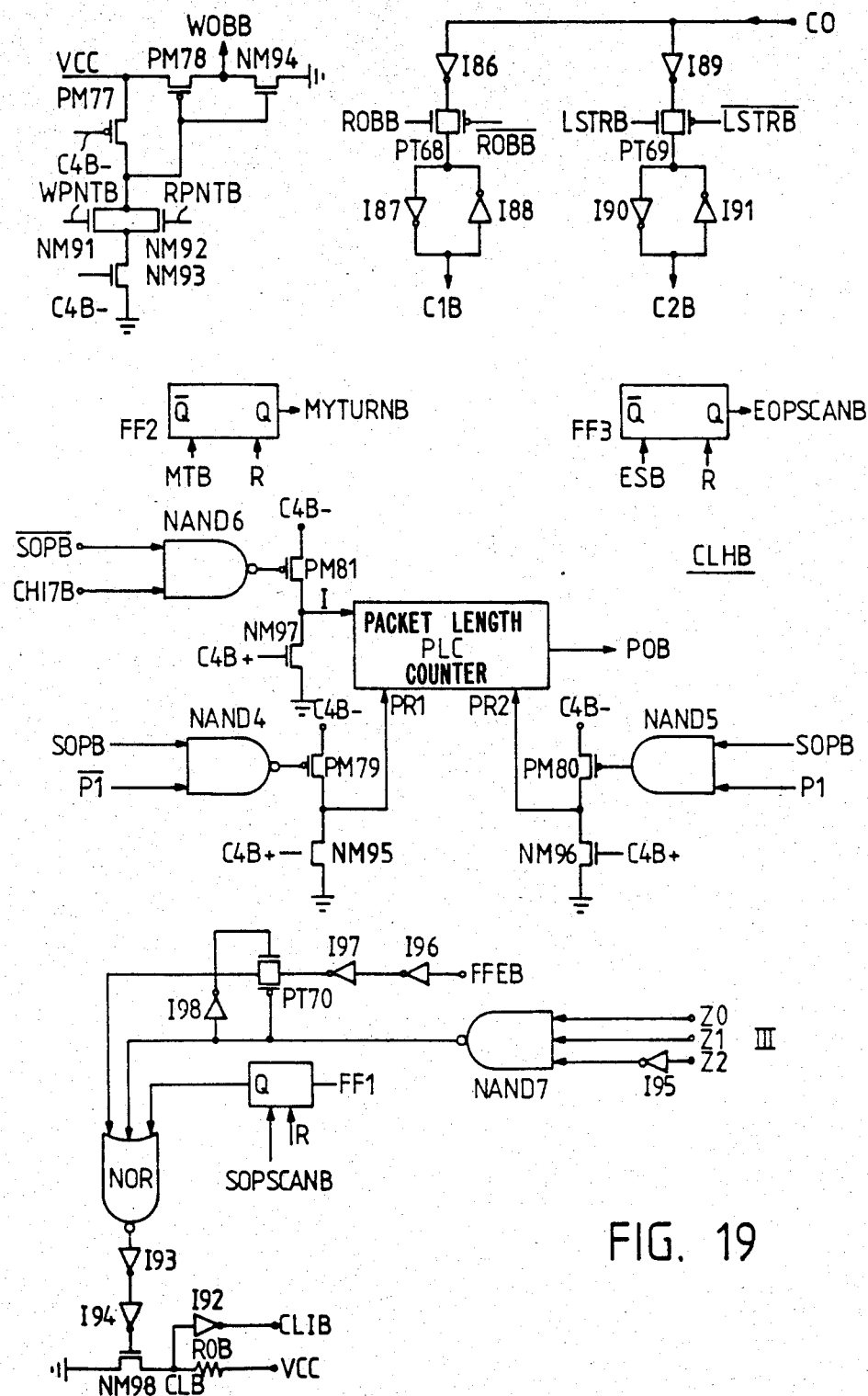
Figure 20:
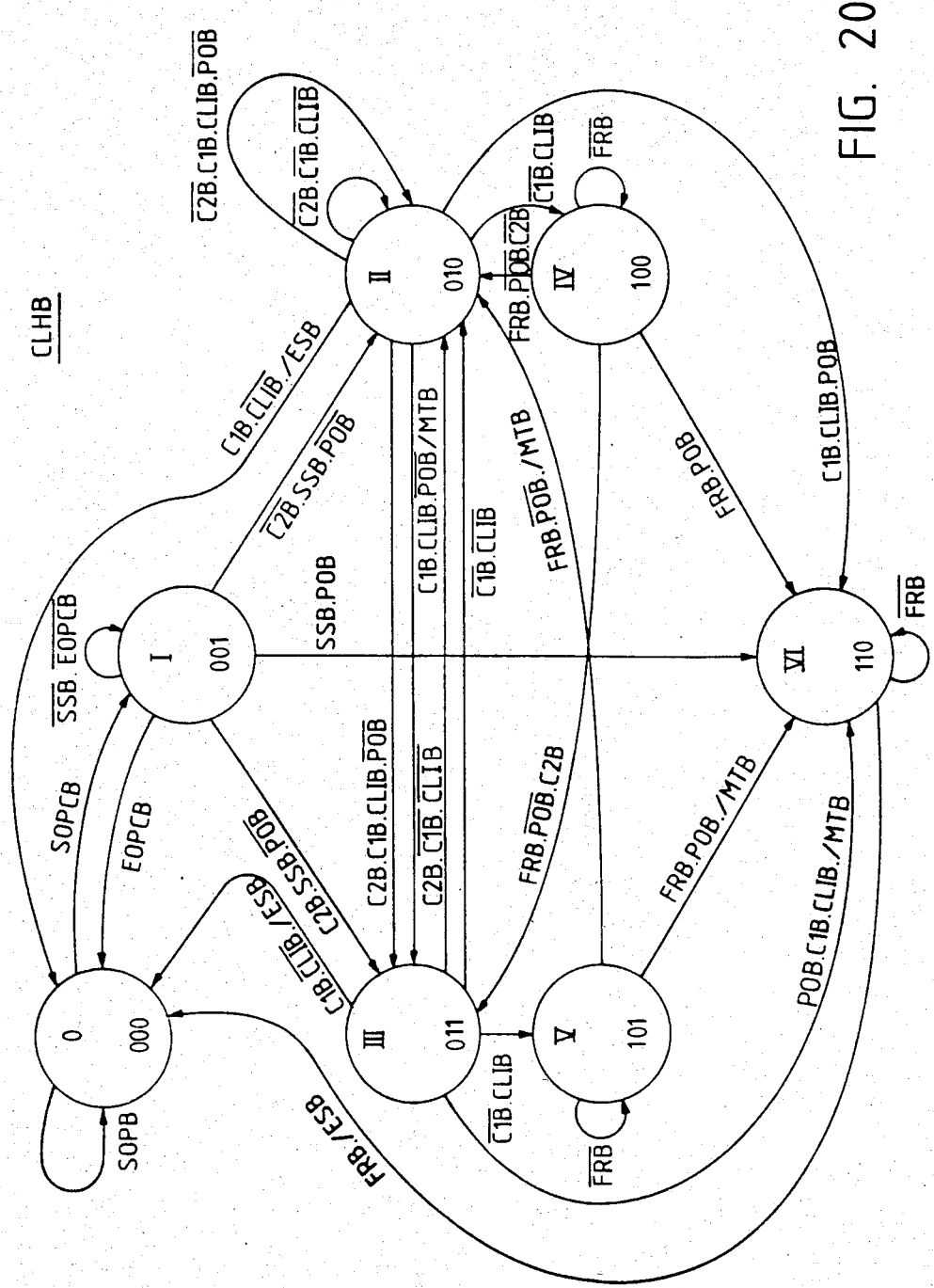

FIGS. 3, 4 and 5 arranged as shown in FIG. 6 represent a block diagram of control circuit DPTC0 of FIG. 1;

FIG. 7 shows timing signals used in this control circuit;

FIG. 8 is a flow chart used to illustrate the operation of this control circuit;

FIGS. 9 and 10 represent the circuits OLDCINPISO, CINSIPO, SBA and part of DMCL of FIG. 5 in more detail;

FIG. 11 shows a timing signal used in the circuits of FIGS. 9 and 10;

FIG. 12 represents the circuits CAM and DMEM of FIG. 4 in more detail;

FIGS. 13 and 14 show cells C156 and C150 of FIG. 12 in more detail respectively;

FIG. 15 represents the channel assignment circuit FFS of FIG. 4 in more detail;

FIG. 16 show timing signals used in this circuit;

FIGS. 17, 18 and 19 show the priority circuit CLHB of FIG. 3 in more detail;

FIG. 20 represents a state diagram of the circuit FSM of FIG. 17.

The telecommunication switching system shown in FIG. 1 includes a switching network SNW which is coupled via connections X and Y with two terminal control elements TCEA and TCEB which are each coupled to each of 32 control circuits DPTC0/31 via four links TINA/B, TOUTA/B, C4096A/B and FA/B. Each of these control circuits DPTC0/31 is connected to an associated transcoder and filter circuit TCF0/31 via two links LIN0/31 and LOUT0/31. Each associated pair of a DPTC0/31 and a TCF0/31 is common to 16 line or terminal circuits each comprising the cascade connection of a DPTC0/31, a TCF0/31, a digital signal processor DSP0/511 and a subscriber line interface circuit SLIC0/511 coupled to a telecommunication line TL0/511. More particularly, DPTC0 and TCF0 which are interconnected by LIN0 and LOUT0 are common to 16 line circuits (as indicated by the multipling arrows) further including DSP0/15 and SLIC0/15 which are coupled to telecommunication lines TL0/15 respectively. Likewise, DPTC31 and TCF31 which are interconnected by LIN31 and LOUT31 are common to 16 line circuits including DSP496/511 and SLIC496/511 which are coupled to telecommunication lines TL496/511 respectively. Each DPTC0/31 is also connected to the associated 16 digital signal processors via a set of three links COV0/31, COD0/31 and CIN0/31. More particularly, DPTC0 is connected to DSP0/15 via COV0, COD0 and CIN0 and DPTC31 is connected to DSP496/511 through COV31, COD31 and CIN31. Each of the control circuits DPTC0 to DPTC31 has five identity terminals S04/S00 to S314/S310 and is further connected to a voltage supply terminal VCC=5 Volts via two resistors R0A, R0B to R31A, R31B. These are connected to conductors CLA and CLB interconnecting all DPTC0 to DPTC31.

The above transcoder and filter circuits TCF0/31 are of the type disclosed in Belgian Pat. Nos. 897 771 and 897 773. The SLIC0/511 are of the type disclosed in Belgian Pat. Nos. 898 049, 898 050, 898 051 and 898 052.

TINA/B and TOUTA/B which have access to each of DPTC0 to DPTC31 are links which are each used on a time division multiplex or TDM basis comprising frames of 32 TCE channels CH0/31. These frames are delimited by frame pulses FA/B transmitted from TCEA/B to DPTC0/31 on frame conductors FA/B. Each channel comprises 16 time slots TS0/15 defined by 4,096 MHz clock pulses C4096A/B transmitted from TCEA/B to DPTC0/31 on clock conductors C4096A/B. Channels 0 and 16 are used for synchronization and control purposes respectively, whilst the other ones are normally used to convey speech. As shown in the timing diagram of FIG. 2 for TINA, TOUTA, C4096A and FA, each of the channels CH0/31 is used to transmit bits 0, ..., 9, A, ..., F so that the bit rate is 4096 Mbit/sec. To be noted that there is a difference of −18 mod 32 or 14 between the numbers of time coincident TINA and TOUTA channels, e.g. between TINA channel 0 and TOUTA channel 14, and that the TCE channels of TINA, TOUTA are asynchronous in phase with those of TINB, TOUTB because TCEA and TCEB operate independently from each other.

LIN0/31 and LOUT0/31 are links which are also each used on a TDM basis comprising frames of 32 channels CH0/31, the frames being delimited by locally generated frame pulses FL. Each channel comprises 16 time slots defined by locally generated 4096 MHz clock pulses C4096L. As shown in the timing diagram of FIG. 2 for LIN0 and LOUT0, each of the channels thereof is used to transmit 8 bits 0 to 7 so that the bit rate is equal to 2,048 Mbit/sec. Because each pair of LIN/LOUT conductors is used for 32 channels and has access to 16 telecommunication lines two such channels are permanently allocated to one telecommunication line. For instance LOUT/LIN channels N and N+16 are permanently allocated to line N.

Figure 2:
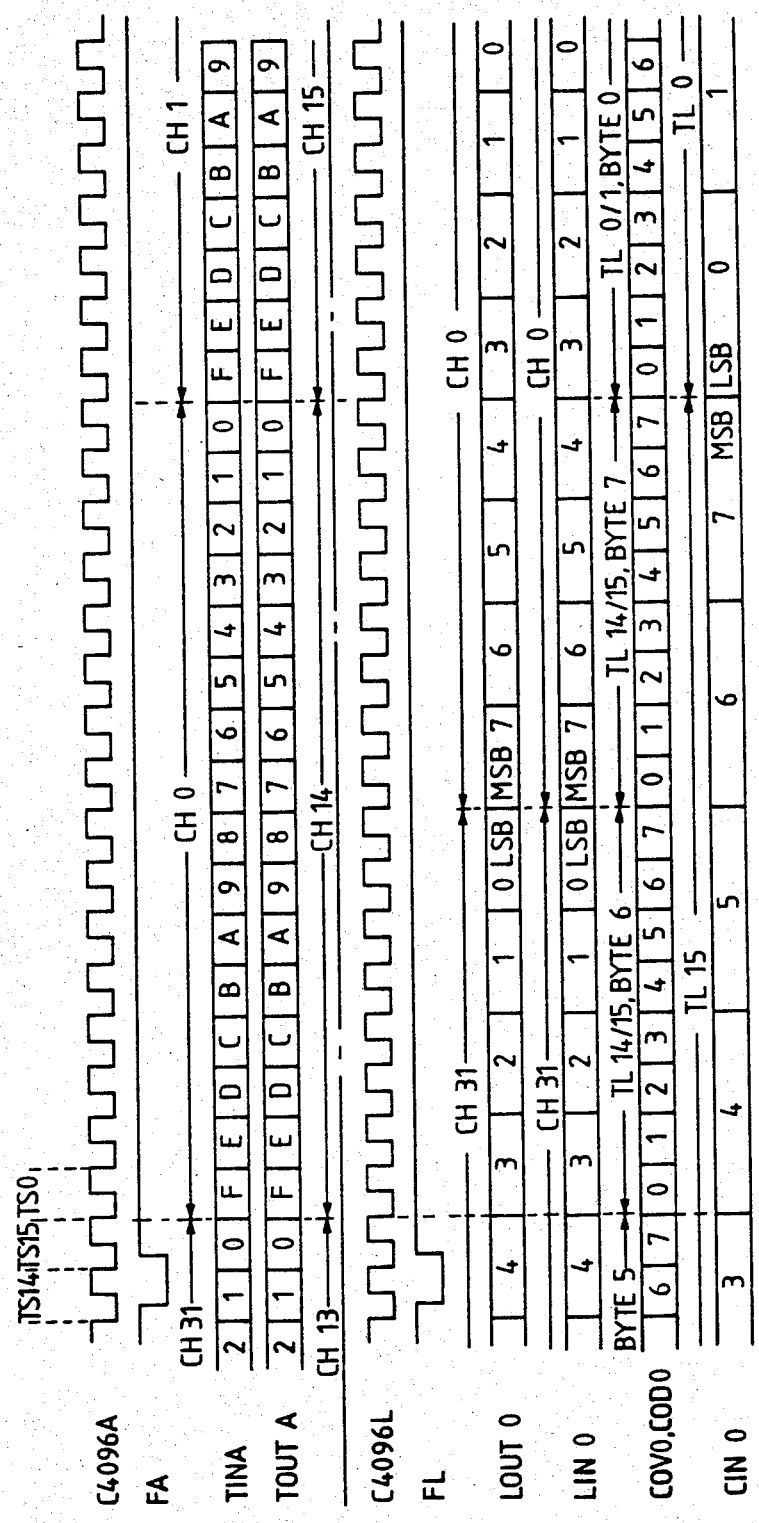
FIG. 2 is a timing diagram showing timing signals used in the system of FIG. 1.

COV0/31 and COD0/31 are conductors which are each used on a TDM basis to transmit 7 bytes (BYTES0/6) of drive bits 0/7 and one byte (BYTE7) of scan bits 0/7 per line from the corresponding DPTC0/31 to the associated DSP0/511 at a rate of 4096 Mbit/sec as shown on FIG. 2 for COV0, COD0 and lines TL0/15.

CIN0/31 are conductors which are each used on a TDM basis comprising frames of 16 channels to transmit one byte (BYTE7) of scan bits 0/7 from the corresponding telecommunication line TL0/511 to the associated DPTC0/31 at a rate of 1024 Mbit/sec, as shown on FIG. 2 for CIN0 and TL0/15.

CLA and CLB are conductors which are each used on a TDM basis comprising frames of 32 channels allocated in a variable way to respective ones of the 32 control circuits DPTC0/31 and each comprising 16 time slots. The time slots of CLA and CLB coincide with those of the channels of TINA/TOUTA and TINB/TOUTB respectively.

Reference is now made to FIGS. 3 to 5 which when arranged as shown in FIG. 6 represent a block diagram of control circuit DPTC0 of FIG. 1. This DPTC0 includes the following circuits:

- a channel 16 processor CH16PR (FIG. 4) of the type described in the copending patent application of even date entitled: "Système de commutation applicable aux télècommunications"
- a control memory CAM (FIG. 4);
- a dynamic random access memory DRAM (FIG. 5);
- a data memcry DMEM (FIG. 4);
- priority circuits CLHA and CLHB (FIG. 3);
- a channel address computation circuit CHAC (FIG. 3)
- a time slot allocation circuit TSALL (FIG. 3);
- a logic circuit CLC (FIG. 5);
- a scan byte analyzer SBA (FIG. 5);
- a channel assignment circuit FFS (FIG. 4);

a switch circuit CAMS (FIG. 4) associated to the control memory CAM;
decoder circuits DECA, DECB, DLA and DLB (FIG. 3);
a channel 16 main decoder circuit CH16MDEC (FIG. 4);
a channel 16 decoder circuit CH16DEC (FIG. 3);
multiplexers MUX1 to MUX4 (FIGS. 4, 5);
16-bit serial-in-parallel-out registers SIPOA, SIPOB, SIPOL (FIG. 3) and CINSIPO (FIG. 5);
16-bit parallel-in-serial-out registers PISOA, PISOB, PISOL (FIG. 3) and OLDCINPISO, COVPISO and CODPISO (FIG. 5);
temporary latching circuits TLA and TLB (FIG. 3);
a DPTC selection circuit DPTC SEL (FIG. 4);
8-bit FIFO registers FIFOA and FIFOB (FIG. 5);
FIFO control circuits FIFOAC and FIFOBC (FIG. 5);
16-bit instruction registers IRA and IRB (FIG. 4);
a register SP8 (FIG. 4);
counters AMC, BMC and DMC (FIG. 3);
a logic circuit DMCL (FIG. 5);
a 16-bit bus DF/D$\emptyset$ (FIGS. 3, 4) via which 16 bits DF, DE, ..., DA, 9, ... $\emptyset$ can be transmitted in parallel, with DF being the most significant bit MSB. This bus interconnects PISOL, SIPOL, PISOA, TLA, SIPOA, DECA, PISOB, TLB, SIPOB, DECB, DMEM, IRA and IRB;
an 8-bit bus BB7/$\emptyset$ (FIGS. 4, 5) via which 8 bits BB7 to BB$\emptyset$ may be transmitted in parallel, with BB7 being the most significant bit (MSB). This bus interconnects IRA, IRB, SP8, DRAM, FIFOB, FIFOA, CODPISO, COVPISO, CINSIPO and OLDCINPISO;
a 5-bit bus CAM4/$\emptyset$ (FIG. 4) interconnecting CAM and FFS through CAMS;
an 8-bit bus FF7/$\emptyset$ interconnecting FFS and SP8.

The above mentioned links TINA, TOUTA, TINB, TOUTB, LIN$\emptyset$ and LOUT$\emptyset$ (FIG. 3) are connected to SIPOA, PISOA, SIPOB, PISOB, SIPOL and PISOL respectively, the latter circuits having moreover read or write inputs RPA, WPA, RPB, WPB, RSIPOL and WPISOL respectively. SIPOA which is able to store a 16-bit word TIA15/$\emptyset$ received on the bus DF/D$\emptyset$ moreover has outputs TIA3/$\emptyset$ connected to the priority circuit CLHA Likewise, SIPOB which is able to store a 16-bit word TIB15/$\emptyset$ has outputs TIB3/$\emptyset$ connected to CLHB. Decoder circuit DECA associated to SIPOA has outputs SOPA and SOPSCANA connected to CLHA and temporary latch circuit TLA has read and write inputs RTA and WTA. Likewise, DECB has outputs SOPB and SOPSCANB connected to CLHB and temporary latch circuit TLB has read and write inputs RTB and WTB. The read and write signals RPISOL, WPISOL, RTA, RTB, WTA, WTB are provided by the time slot allocation circuit TSALL, whilst RPA and RPB are generated by the decoder circuits DLA and DLB associated to the counters AMC and BMC respectively.

The above mentioned conductors C4096A, FA, C4096B and FB (FIG. 5) are connected to the control circuit CLC (FIG. 5) which provides at its outputs the following signals:
the four 4096 MHz series of clock pulses C4A+, $\overline{C4A+}$, C4A−, $\overline{C4A-}$ which are synchronous with the pulses C4096A received from TCEA;
the four 4096 MHz series of clock pulses C4B+, $\overline{C4B+}$, C4B−, $\overline{C4B-}$ which are synchronous with the pulses of C4096B received from TCEB;
the four 4096 MHz series of clock pulses C4+, $\overline{C4+}$, C4−, $\overline{C4-}$ which are locally generated in CLC by a phase locked loop (not shown) to which the pulses C4096A and C4096B are selectively applied. The last mentioned clock pulses are as shown in FIG. 7. The other pulses C4A+, C4B+, ... etc. are similar but shifted in phase:
the clock pulses C4096L coinciding with C4−;
the frame pulses FL.

The clock pulses C4A+, ... having the same frequency as C4096A and the frame pulses FA control 9-bit counter AMC (FIG. 3) which provides at its outputs 9 bits AMC8/$\emptyset$ of which
the 5 most significant bits (MSB) AMC8/4 define 32 TCEA channels, i.e. channels of TINA/TOUTA;
the 4 least significant bits (LSB) AMC3/$\emptyset$ define 16 time slots TS15/$\emptyset$ per TCEA channel. The bits AMC8/4 and AMC3/$\emptyset$ control the channel address computation circuit CHAC and the decoder circuit DLA associated to AMC respectively. DLA provides the above mentioned output signal RPA which is used to control TSALL and to read the contents of SIPOA into the temporary latch circuit TLA and generates a channel 17 signal CH17A. This signal is activated during time slot TS$\emptyset$ of channel 17 and controls the priority circuit CLHA.

The 9-bit counter BMC (FIG. 3) and the associated decoder circuit DLB are controlled by clock pulses C4B+, ... and operate in a similar way as AMC and DLA and provide output signals BMC8/$\emptyset$ and RPB controlling CHAC, TSALL and SIPOB.

Counter DMC (FIG. 3) is a 9-bit counter which is controlled by the clock pulses C4+, ... having the same frequency as C4096L and provides at its outputs 9 bits DMC8/$\emptyset$ of which:
the 5 most significant bits DMC8/4 define 32 line channels i.e. channels of LIN$\emptyset$/LOUT$\emptyset$;
the 3 bits DMC3/1 define 8 bits or one byte per channel;
the bit DMC$\emptyset$ defines 2 time slots per bit, the bit rate being equal to 2024 Mb/sec.

The outputs DMC8/$\emptyset$ of DMC control SBA (FIG. 5) and DMCL; the outputs DMC8/4 control the CHAC; the outputs DMC3/$\emptyset$ control TSALL and the outputs DMC8/3 control MUX3(FIG. 5).

From the above it follows that the address computation circuit CHAC is controlled by the counter outputs AMC8/4, BMC8/4 and DMC8/4. CHAC provides at its outputs CHC4/$\emptyset$ an output value CHC4/$\emptyset$ which is supplied to the control memory CAM, to FFS as well as to the channel 16 decoder circuit CH16DEC. CHC3/$\emptyset$ is supplied to MUX3.

The CHAC includes a substractor circuit (not shown) and is able to compute the difference of DMC8/4 and AMC8/4 or BMC8/4 as well as the difference of AMC8/4 or BMC8/4 and either 1 or 17. The CHAC also includes a latch circuit (not shown) to latch the output signal of the subtractor circuit as a channel address for the CAM or for FFS.

In connection with the above it should be noted that the number m of a TCE channel AMC8/4 or BMC/4 stored in AMC or BMC is the number of the channel for which the data are being received from TINA or TINB so that m−1 is the channel number for which the data are already stored in TLA or TLB. When data to be transmitted to a line circuit are being received from TINA or TINB in TCE channel m, data coming from this line circuit should be transmitted to TCEA/B on TCE channel m−18 of TOUTA or TOUTB, as will be explained later. At that moment the number of the TCE channel number stored in AMC or BMC is equal to m−17. For these reasons CHAC has been designed to calculate m−1 and m−17 from the value of the channel number AMC8/4 or BMC8/4 stored in AMC or BMC respectively.

The time slot allocation circuit TSALL generates the following output signals:

RDP, WDP, ELIN and ETCE which are applied to data memory DMEM. RDP and WDP control the reading and writing of data in DMEM; ELIN enables data relating to a line to be transferred from DMEM and ETCE enables data relating to TCEA or TCEB to be transferred to or from DMEM;

L-A and L-B which are on 1 when the value CHC4/$\emptyset$ provided by CHAC is equal to the difference of the line channel number DMC8/$\emptyset$ provided by DMC and the TCEA or TCEB channel number AMC8/4 or BMC8/4 generated by AMC and BMC respectively;

WTA, WTB, RSIPOL and RPISOL which have been mentioned above;

MA, MB, ML to select AMC8/4, BMC8/4 or DMC8/4 respectively;

MAL to select AMC8/4 for the computation of the difference of AMC8/4 and DMC8/4;

MBL to select BMC8/4 for the computation of the difference of BMC8/4 and DMC8/4;

M1 to select the constant value 1 for the computation of the difference of AMC8/4 or BMC8/4 and 1;

M17 to select the constant value 17 for the computation of the difference of AMC8/4 or BMC8/4 and 17;

MSUB to latch the output signals of the above mentioned substrator circuit in CHAC as channel address for CAM or FFS.

The DRAM stores the above mentioned 8 bytes per line i.e. 7 drive bytes BYTES $\emptyset$/6 and 1 scan byte BYTE7.

The logic circuit DMCL is controlled by the output signals DMC8/$\emptyset$ of DMC, by the clock signals $\overline{C4+}$, $\overline{C4-}$, and of CLC and by the selection bit A/B. This bit indicates for which side the channel 16 processor CH16PR works or has to work i.e. for the A-side (TCEA) or B-side (TCEB), as explained in the above mentioned copending Belgian patent application.

The DMCL generates the following output signals:

clock signals C1+, $\overline{C1+}$, C1−, $\overline{C1-}$ which are derived from clock signals C4+, $\overline{C4+}$, C4−, $\overline{C4-}$ by frequency division by four so that they have a frequency of 1024 MHz;

WRAM, RRAM and DRAME which are applied to the DRAM to write data into the DRAM, to read data from the DRAM and to enable the DRAM respectively;

selection signals T1, T$\emptyset$ and S$\emptyset$, S1 which control multiplexer MUX3 in such a way that either one of four addresses CC3/$\emptyset$ DMC8/3, CHC3/$\emptyset$ and BYAD2/$\emptyset$ is applied to the DRAM. CC3/$\emptyset$ is a line address provided by CH16MDEC; CHC3/$\emptyset$ is a TCE channel address generated by CHAC; DMC8/3 is an address provided by DMC and used when handling the CIN and COV/COD lines and BYAD2/$\emptyset$ is a byte address defining one among 8 bytes;

RCINOLD and WCINOLD which are supplied to the DRAM and to OLDCINPISO respectively and permit data to be read from the DRAM to be written in the OLDCINPISO, all via the 8-bit bus BB7/$\emptyset$;

RCIN and WCIN which are supplied to CINSIPO and to DRAM respectively and permit data to be read from CINSIPO and to be written in the DRAM, all via the bus BB7/$\emptyset$;

WCOV and WCOD which are connected to COVPISO and to CODPISO respectively and permit data to be written into COVPISO and CODPISO respectively.

The above mentioned input conductor CIN is connected to an input of CINSIPO and outputs of COVPISO and CODPISO are connected to the above mentioned output conductors COV and COD respectively. The outputs of OLDCINPISO and CINSIPO are connected to scan byte analyzer circuit SBA which is further controlled by Cl+, Cl− generated by DMCL, by the outputs DMC8/$\emptyset$ of DMC, by FFFA and FFFB of FIFOAC and FIFOBC and by ASS, ACT and MMIE provided by CAM. FFFA and FFFB indicate that FIFOA and FIFOB are full respectively and ASS, ACT and MMIE are an assignment bit, an activity bit and bit for enabling or disabling a mismatch reporting respectively. These bits which are stored in the CAM define the status of a line.

The purpose of the scan byte analyzer SBA is to derive mismatch information from the contents of OLDCINPISO and CINSIPO and to write mismatch data into FIFOA and/or FIFOB. To this end it provides output write signals WFIFOA and WFIFOB which control the associated control circuits FIFOAC and FIFOBC and a read status signal RSTATUS which is supplied to the channel 16 address processor CH16PR in order that the latter should apply a WCAM signal to the decoder DEC of the CAM. RSTATUS is also supplied to the select input of multiplexer circuit MUX4 to which DMC8/5 and CC3/$\emptyset$ are applied. The output signal of MUX4 is supplied to the input of the same decoder DEC.

FIFOAC and FIFOBC generate control output signals FFFA, FFFB and FFEA, FFEB which indicate that the associated FIFOA or FIFOB is full or empty respectively. The channel 16 processor CH16PR is able to supply read signals RFIFOA and RFIFOB to FIFOAC and FIFOBC respectively.

To be noted that because DMLC is controlled by the 1024 MHz clock signals Cl+, Cl−, the 9 bits DMC8/$\emptyset$ received from DMCL have the following meaning in SBA:

bits DMC8/5 define the 16 telecommunication lines TL$\emptyset$/15;

bits DMC4/2 define 8 bytes per line;

bits DMC1/$\emptyset$ define 4 time slots per byte.

The priority circuit CLHA is controlled by the above identity inputs S$\emptyset$4/$\emptyset\emptyset$, by bits TIA3/$\emptyset$ provided by SIPOA, by the signals SOPA and SOPSCANA of DECA, by the signals AMC3/$\emptyset$ of AMC, by output signal CH17A of DLA and by output signal FFEA of FIFOAC. Its output CLA is connected to the common conductor CLA of FIG. 1 and its outputs MYTURNA and EOPSCANA are connected to multiplexer MUX2 (FIG. 4) associated to CH16PR and controlled by the selection signal A/B.

The priority circuit CLHB is identical to CLHA and is connected in a similar way.

The purpose of CLHA is to determine if DPTC$\emptyset$ has priority in a first priority chain over the other DPTC1/31 to transmit to TCEA mismatch information stored in FIFOA. In this case output MYTURNA is activated. When the mismatch information of all DPTC∅/31 has been transmitted to TCEA then an output signal EOPSCANA is generated.

The purpose of CLHB is similar to that of CLHA but now in a second priority chain.

The control memory CAM includes for each of the 16 lines TL∅/15, say N, a row of storage cells for storing the most significant bit MSBL of the LOUT/LIN line channel number N or N+16 associated to this line and a TINA/B channel number assigned to this line by TCEA or TCEB and further, an activity bit ACT, an assignment bit ASS and a MMIE bit, already mentioned above.

A line is unassigned or assigned to TCEA or TCEB according to the following code:

| ACT | ASS | |
|-----|-----|---|
| ∅ | ∅ | unassigned; |
| 1 | ∅ | assigned to TCEA; |
| 1 | 1 | assigned to TCEB. |

The MMIE bit is an enable bit to indicate that mismatch information of the corresponding line should be reported to TCEA or/and TCEB or not.

The decoder DEC associated to CAM permits to read one of the rows of the CAM under the control of R/WCAM and of an output address LI3/∅ of MUX4, this address being CC3/∅ when RSTATUS=1. In this way for instance the status bits ASS, ACT and MMIE are generated at the like named outputs of the CAM and applied to the scan byte analyzer SBA.

The data memory DMEM associated to the CAM and is able to store data for 16 lines TL∅/15.

The purpose of the above mentioned channel 16 decoder CH16DEC (FIG. 3) is to detect if the output CHC4/∅ of the CHAC indicates a channel 16 or not. In this case the CH16DEC provides output signals R16A, W16A, R16B, W16B which control instruction registers IRA and IRB respectively. These registers are also controlled by the read and write signals R8A, W8A, and R8B, W8B provided by CH16PR and used to read data from IRA or IRB and place them on the 8-bit bus BB7/∅ and to write data in the IRA or IRB from this bus.

IRA and IRB each have a 16-bit output and both 16-bit outputs are connected to multiplexer MUX1 the select input of which is controlled by the selection signal A/B provided by CH16PR. The 16-bit output IRF/∅ of MUX1 is connected to the main decoder CH16MDEC. The 5 output signals IR8/4 of MUX1 which define the identity of a DPTC in a Terminal or Line Select instruction TS received from TCEA or TCEB are also supplied to a DPTC selection circuit DPTCSEL. This circuit is also connected to the above mentioned terminals S∅4/∅∅ defining the identity of DPTC∅ and the input signals TS, EOP and A/B are also applied to it, TS and EOP being provided by CH16MDEC. When such an instruction TS is received the input TS of DPTCSEL is activated so as to enable the operation of this circuit and when the identity received from TCEA or TCEB is equal to the identity of DPTC∅, the latter is selected. Accordingly the output SEL of the circuit DPTCSEL is activated and this fact is communicated to CH16PR. EOP is used to reset DPTCSEL. Such a reset also occurs in case of the receipt of a new TS instruction or when the compared identities are different.

The purpose of CH16MDEC is to decode the various instructions received under the form of packets on the 16-bit bus IRF/∅ and to generate and latch the following output signals (amongst many others):

CC3/∅: a line address;
BYAD2/∅: a byte address;
SOP: is activated when a start of a packet instruction SOP is received from TCEA or TCEB;
EOP: is activated when an end of packet instruction EOP is received;
SOPSCAN: is activated when a start of scanning instruction is received;
TS: is activated when a terminal circuit or line circuit has to be selected;
BYTE 1: is activated when the byte received in an instruction is BYTE 1 of the 8 bytes stored per line in the DRAM;
R/W is activated when the instruction is a write instruction; ACT is the above activity bit.

The last mentioned output signals SOP, EOP, SOPSCAN, TS, BYTE1, R/W and ACT are supplied to CH16PR together with SEL. the RSTATUS signal and the output signals EOPSCAN and MYTURN of MUX2. CH16PR provides the following output signals RFIFOA, RFIFOB, RBA, WBA, RFA, WFA, FFW, RBB, WBB, WSP8C4+, RSP8C4+, WSP8C4−, RSP8C4−, R/WCAM, STARTFFS and MSBLVALC4+.

RFIFOA and RFIFOB are supplied to FIFOAC and FIFOBC respectively; RBA, WBA and RBB, WBB are supplied to IRA and IRB respectively; R/WCAM is supplied to CAM; STARTFFS, MSBLVALC4+, WFA, RFA and FFW are supplied to FFS; WSP8C4+, RSP8C4+; are applied to SP8 and CAMS and WSP8C4− and RSP8C4− are supplied to SP8.

The line channel assignment circuit FFS is adapted, after a TINA/B channel has been allocated to a line, say N, to search a suitable line channel among the two LOUT∅ line channels N and N+16 which are permanently associated to this line. To be noted that for LIN∅ the same channel is used as for LOUT∅. FFS is controlled by CHC4/∅ which is provided by CHAC, by CC3/∅ provided by CH16MDEC, by L-A and L-B supplied by TSALL, and by A/B, WFA, RFA, FFW and STARTFFS generated by CH16PR. The output signal MSBL of FFS in ∅ or 1 depending on the selected LOUT∅/LIN∅ line channel being N or N+16 and is used to set the corresponding bit MSBL in the CAM in the row thereof which is permanently associated to the line.

It should be noted that TCEA and TCEB are of the type described in the article: "ITT 1240 Digital Exchange Hardware Description", published in Electrical Communication, Vol. 56, No. 2/3, 1981, pp. 135-147.

Principally referring to FIGS. 3 to 5 and to the flow chart of FIG. 8, the operation of DPTC∅ is briefly described hereinafter.

The 16 DSP∅/15 associated to DPTC∅ continuously transmit bytes of scan data of the lines TL∅/15 to DPTC∅ via the link CIN∅. The latter is used on a TDM basis with frames of 16 channels, and with a bit rate of 1024 Mbit/sec. This continuous bitstream is supplied to CINSIPO (FIG. 5) and each time a new scan byte for a line is entered therein the logic circuit DMCL generates read and write signals RCINOLD and WCINOLD and applies via MUX3 the line and scan byte (YTE7) address DMC8/3 to the DRAM. As a result and under the control of RCINOLD the previous or old scan byte of the line concerned is read from the DRAM and supplied to the 8-bit bus BB7/∅ and then written in the OLDCINPISO under the control of WCINOLD. Corresponding bits of the new and old scan bytes are compared in the scan byte analyzer circuit SBA which moreover issues a read status signal RSTATUS to obtain the values of the status bits ACT, ASS and MMIE for the line concerned. More particularly, the signal RSTATUS applied to the selection input of the multiplexer circuit MUX4 selects the line identity DMC8/5 and applies it to the decoder input of the CAM. The signal RSTATUS is also conveyed to the channel 16 processor CH16PR as a result of which the latter issues a signal R/WCAM which is also applied to the decoder input of the CAM. As a result the row of the CAM corresponding to the line concerned is read out and the bits ACT, ASS and MMIE thereof are applied to SBA. SBA can thus decide what has to be done with the compared data. It is supposed that ACT=∅, ASS=0 and MMIE=1, meaning that the line has not yet been assigned to TCEA or TCEB and that MMI data for this line should be reported to TCEA and TCEB. For this reason, each time a mismatch is detected between two compared bits of CINSIPO and OLDCINPISO the following mismatch information byte is written in both FIFOA and FIFOB by FIFOAC and FIFOBC under the control of WFIFOA and WFIFOB generated by SBA:

DMC8/5, N, DMC4/2 wherein

DMC8/5 is the line identity;
N is the new state of the bit;
DMC4/2 is the bit position in the scan byte of the bit exhibiting a change.

After at least one mismatch information byte has thus been written into FIFOA and FIFOB the outputs FFEA and FFEB of FIFOAC and FIFOBC become de-activated to indicate that these registers are not empty. By means of these signals FFEA and FFEB the priority circuits CLHA and CLHB are informed that in DPTC∅ MMI data has to be transmitted to TCEA and TCEB respectively.

To be noted that when MMIE=1 and for
ACT=1 and ASS=∅  MMI data is written in FIFOA only
ACT=1 and ASS=1 MMI data is written in FIFOB only
If MMIE=∅, no MMI data is written in FIFOA and FIFOB.

After all the 8 bits of a scan byte have thus been analyzed, DMCL issues read and write signals RCIN and WCIN under the control of which the contents of CINSIPO are first transferred to the 8-bit bus BB7/∅ and then written in the DRAM at the line and byte address DMC8/3 provided by DMCL via MUX3.

As already mentioned above, the priority circuit CLHA of DPTC∅ is connected to a common line CLA to which all the other DPTC1/31 are coupled. The various CLHA are connected in a priority chain which is such that a distinct but variable channel among the 32 CLA channels which run synchronously with the TINA channels is assigned to each CLHA. During this channel time the CLHA may ground the common line CLA when MMI data are present in FIFOA (as indicated by FFEA=0). In this way DPTC∅ informs the other DPTC1/31 about the fact that it has priority to send MMI data to TCEA in channel 16 of TOUTA. In this case also the output signal MYTURNA of CLHA is activated and communicated to CH16PR in order that the latter should indeed transmit the MMI information to TCEA.

The same is true for CLHB which forms part of another priority chain so that DPTC∅ may also have priority in this chain, now however, to transmit MMI data to TCEB. In this case the output signal MYTURNB of CLHB is activated and CH16PR is informed. Both the signals MYTURNA and MYTURNB are indeed supplied to multiplexer MUX2 which is associated to CH16PR.

It is supposed that TCEB sends the instruction start of packet SOP and start of scan SOPSCAN. These instructions are therefore called SOPB and SOPSCANB. The instruction SOPB is received in SIPOB of each DPTC∅/31 and then loaded into IRB and decoded in CH16MDEC due to which the output SOP is activated. As a consequence the channel 16 processor CH16PR which was previously in the wait position A is brought in the position B where it waits for another instruction, as follows from the flow chart of FIG. 8. The following instruction 8 SOPSCAN is also received in SIPOB of each of the DPTC∅/31 and then loaded in IB and decoded in CH16MDEC. Due to this the output SOPSCAN is activated and CH16PR is brought in the position C wherein it will then later check if there is a MYTURN signal.

The processor then selects for instance signal MYTURNB by means of the selection signal A/B so that the output MYTURN of MUX2 is activated and activates the FIFO read signal RFIFOB. By means of this signal one MMI byte e.g. relating to line TL∅, of FIFOB is read and applied to the 8-bit bus BB7/∅. Under the control of write signal W8A this MMI byte is written in IRB from this 8-bit bus. Afterwards these data together with a code and the identity of DPTC∅ are transferred in a TOUTB channel 16 to TCEB via PISOB. This happens under the control of read and write signals provided by CH16DEC.

All the MMI bytes stored in FIFOB are thus transferred from DPTC∅ in TOUTB channel 16 and CH16PR is each time brought in wait position C (FIG. 8).

When CLHB detects that none of all the DPTC∅/31 have MMi data to be sent to TCEB, it activates its output EOPSCANB which is connected to MUX2. When CH16PR detects the presence of this signal it transmits a signal EOP and returns to position A to TCEB.

Because TCEB receives the MMI data concerning line TL it is decided therein to supervise this line TL∅ and to allocate a TCE channel to this line, e.g. CH31. For this reason TCEB sends the following three instructions successively to all DPTC∅/31 in successive channels 16 of TINB:

SOP: a "start of packet" instruction;
A "Terminal or line Select" Instruction TS:

1∅∅∅111S∅4/∅∅, CC3/∅ wherein
S∅4/∅∅ is the identity of DPTC∅;
CC3/∅ is the identity of line TL∅

A terminal or line write instruction TW (Byte Mode):

1∅∅11, BYAD2/∅, D, D, ACT, CH31 wherein
BYAD2/∅ is the identity of BYTE1;

the bits DD are bits "don't care";

ACT is the new activity bit;

CH31 is the TINB channel which is assigned by TCEB to the line TL∅ indicated in the preceding instruction TS;

the fifth bit is the R/W bit indicating if the instruction is a write (R/W=1) or a read (R/W=∅) instruction.

The instruction SOP is received in SIPOB of each DPTC∅/31 and then loaded into IRB and decoded in CH16MDEC due to which the output SOP is activated. As a consequence the channel 16 processor CH16PR which was previously in the wait position A is brought in the position B where it waits for another instruction, as follows from the flow chart of FIG. 8.

The following instruction TS is also received in SIPOB of each of the DPTC∅/31 and then loaded in IRB and decoded in CH16MDEC. The selection signal A/B generated by CH16PR is supposed to be ∅ indicating that the B-side (TCEB) has been selected. Under the control of this signal the latter decoder provides an activated TS signal at its like named terminal and latches the line address CC3/∅ of TL∅ contained in the instruction. Thus TL∅ has been selected. The processor then returns to the wait position B. The output signal TS of CH16MDEC is applied to DPTCSEL to activate the latter and in this selector the identity CC of DPTC∅ contained in the instruction TS is compared with the identity of DPTC∅/31 continuously applied to DPTCSEL. Therefore only DPTCSEL of DPTC∅ generates a terminal or line select signal SEL which is applied to CH16PR.

The next instruction TW is also received in SIPOB of each of the DPTC∅/31, then loaded in IRB and decoded in CH16MDEC. But because only in DPTC∅ the output SEL of CH16MDEC is activated, only therein the outputs TS, R/W, ACT and BYTE 1 of this decoder are checked. These outputs are all activated. As shown in the flow chart the processor checks:

if the terminal or line has been selected or not by checking the output terminal TS. Because this line TL∅ has been selected (TS=1) the processor then checks if the instruction is a read or write instruction by checking the output terminal R/W. Because the instruction TW is a write instruction the processor then checks if the byte is BYAD2/∅ of TW is the identity of BYTE1 or not. Because this is so (output BYTE1=1) the processor then transfers part of the contents of IRB and more particularly ACT and CH31 to SP8 under the control of the signals R8B and WSP8C4− which first read these content of IRB and place them on the 8-bit bus and then write these contents in the register SP8 from this bus. The processor also issues a R/WCAM signal to write the contents ACT, CH31 of SP8 into the CAM, via CAMS controlled by WSP8C4+, at the line address LI3/∅=CC3/∅ of line TL∅ provided at the output of MUX4 due to RSTATUS being ∅. Also $\overline{A/B}$ which constitutes the assignment bit ASS and is equal to 1 is written in the CAM. In this way TINB channel CH31 is allocated to line TL∅ and because ACT−ASS=1 TL∅ is assigned to TCEB for processing. The processor afterwards checks if the output ACT is activated or not. Because this is so the processor then starts an operation to assign a LOUT∅ channel to the line TL∅ and therefore to the TINB channel CH31. This happens by applying a signal STARTFFS to circuit FFS together with the selection signal A/B. FFS is also controlled by CHC4/∅ provided by CHAC;

CC3/∅ generated by CH16MDEC;

L-A and L-B provided by TSALL. As already mentioned above L-A or L-B is on 1 when CHC4/∅ is equal to the difference of the line channel number DMC8/∅ provided by DMC and the TCEA or TCEB channel number AMC8/4 or BMC8/4 generated by AMC and BMC respectively.

The purpose of FFS is to calculate which one of the two LOUT∅ line channel numbers ∅ or 16 which are permanently allocated to the line TL∅ will effectively be assigned to this line and hence to TINB channel CH31.

The line channel assignment circuit FFS operates as follows:

it calculates first the LOUT∅ channel number which is substantially time coincident with the TINB channel number CH31 by computing 31+L−B, L−B being the difference between the numbers of one pair of time coincident LOUT∅ and TINB channels;

it afterwards calculates (31+L−B−∅) mod.32, (∅ being due to TL∅) and then checks if this algebraic sum is larger or smaller than 16. Thus it is checked which one of the two LOUT∅ channels CH∅ or CH16 follows most closely TINB channel CH31;

if L−B is for instance equal to 2 then this sum is equal to 1 and because this sum is smaller than 16 the LOUT∅ channel CH16 follows most closely TINB channel CH31 and is therefore selected;

if L−B is for instance equal to 19 then LOUT∅ channel CH∅ is selected.

It is supposed that LOUT∅ channel CH16 has been selected. The identity of this channel differs from that of line TL∅ by the fact that it has an additional most significant bit MSBL which is equal to 1. This bit MSBL is written in the CAM on the row allocated to line TL∅ i.e. on row ∅.

To the line TL∅ also LIN∅ channel CH16 is assigned and because TINB channel CH13 has been assigned to this same line the TOUTB channel CH (31+14) mod 32=CH13 is assigned to the line.

Once the TINB, TOUTB, LIN∅ and LOUT∅ channels have been assigned to line TL∅ the transfer of data, e.g. speech, between TCEB and TL∅ via DPTC∅ occurs as follows:

from TCEB via TINB channel CH31 to DPTC∅ where the data is written in row ∅ of DMEM under the control of CAM and afterwards from DMEM to TL∅ via LOUT∅ channel CH16 again under control of CAM;

after the above transfer to LOUT∅ has taken place, data from TL∅ entering DPTC∅ via LIN∅ channel CH16 coinciding with CH16 of LOUT∅ are written in DMEM and afterwards transferred to TCEB via CH13 of TOUTB.

For the last described transmission procedure it is necessary to provide a time interval equal to 18 channel times between the TOUT channel and the TIN channel assigned to a same line. Indeed, because any TIN channel should be able to be assigned to any of the 16 LOUT channels (among the 32) which most closely follow the TIN channel the time interval between this TIN channel and the TOUT channel should at least be equal to 16. Two additional channel times are moreover required because of the phase shifts between the TIN and TOUT channels This gives a total of 18 channel times From the above it follows that the present system has the following characteristics:

by the presence of TCEA and TCEB the reliability of the system is large, because each of these TCEs can process the information of all DPTC∅/31 In fact the MMI data are sent to each TCEA/B as long as a TCEA/B has not been assigned to a line by means of the bits ACT and ASS. By the presence of two TCEs it is also possible to put a TCE out of service for maintenance without problems;

by the transmission of control data, such as MMI data, via the TDM links TINA/B and TOUTA/B which are used for the transfer of speech, no additional control link is required between TCEA/B and DPTC∅/31;

by the presence in each DPTC∅/31 of the scan byte analyser SBA which processes the scan bytes and derives therefrom MMI bytes, the work load of the processors of TCEA/B is decreased;

by the presence of the priority circuit CLHA/B which is able to send to the processor CH16PR a signal EOPSCAN one is sure that all MMI data from all DPTC∅/31 are transmitted without interruption to TCEA/B, so that this happens in a minimum of time;

by the presence of two CLHA/B this time is further decreased;

by the presence of the line channel assignment circuit FFS the time between a TIN channel and a LOUT channel assigned to a same line is a variable minimum Thus the processing capability of the DPTC∅/31 is increased.

In the following more details are given about the circuits SBA, DMCL, OLDCINPISO, CINSIPO (FIGS. 9 to 11); CAM, CAMS, FFS (FIGS. 12 to 16) and CLHB (FIGS. 17 to 2∅) and on their operation.

The registers OLDCINPISO and CINSIPO are shown in the upper part of FIG. 9 together with an additional latch circuit LCC forming part of SBA. FIG. 9 also represents part of DMCL generating the read and write signals RCIN, WCIN, RCINOLD and WCINOLD and FIG. 10 shows the part of SBA which generates the signals RSTATUS, WFIFOA and WFIFOB.

The inputs of the cells of the register OLDCINPISO are coupled to the 8-bit bus BB7/∅ and these cells are controlled by the clock pulses C1+, C1— (FIG. 11) and by the write signal WCINOLD. The outputs of the cells of CINSIPO are also coupled to BB7/∅ and these cells are controlled by the clock pulses C1+, C1— and by the read signal RCIN. The outputs 01 and 02 of OLDCINPISO and CINSIPO are connected to an ExclusiveOR circuit EXOR having output MMIB which is connected to gating circuit GC4 (FIG. 10). The output 02 is moreover connected to an input of cell LC3 of the latch circuit LCC comprising cells LC7/∅ whose outputs are connected to a write bus WF7/∅ for FIFOA and FIFOB. These latch cells have a common read input R which is constituted by the output of a NAND-gate NAND1 comprising the series connection between VCC=5 Volts and ground of PMOS transistor PM∅1 and NMOS transistors NM∅1, NM∅2 and NM∅3 which are controlled by C4—,DMC∅, DMC1 and C4— respectively. When C4— is ∅ the output R of the gate is on 1, whereas when C4— becomes 1 the output R becomes ∅ if DMC∅=DMC1=1, i.e. during time slot TS1 of every of the 8 bits of a scan byte or remains on 1 when this is not so. In other words, during C4—=∅ the capacitance of output R is pre-charged so that this output R is then 1 and during C4—=1 the output is validated so that it becomes ∅ only when the Boolean function $\overline{DMC∅}.DMC1=1$. Bit 7 of the scan byte of line L, bits ∅, 1, 2, . . . of the scan byte of line L+1 and the various time slots are represented in FIG. 11.

SBA (FIG. 10) includes a NAND-gate NAND2 which is similar to and operates in a like way as NAND-gate NAND1 above described. This gate is controlled by DMC∅, DMC1, $\overline{DMC2}$, $\overline{DMC3}$, $\overline{DMC4}$ and $\overline{C4+}$ so that its output is ∅ during time slot TS3 of bit ∅ of a scan byte. The output of NAND2 is connected to output terminal RSTATUS via inverter I1, pass transistor PT∅1 controlled by C4— and $\overline{C4-}$, and inverters I2 and I3 in series so that RSTATUS=1 substantially during the last half of TS3 of bit ∅ and the first half of TS4 of bit 1, as shown in FIG. 11. The output of I2 also controls PMOS transistor PM∅2 which is connected in series with NMOS transistor NM∅4 between a terminal controlled by C4+ and ground, NM∅2 being itself controlled by $\overline{C4+}$. The junction point of PM∅2 and NM∅4 constitutes output terminal LSTATUS on which appears a like named output signal LSTATUS. This signal is on 1 substantially during the first half of TS∅ of bit 1 (FIG. 11). This signal and the inverse thereof provided by inverter I4 control the pass transistors PT∅2 and PT∅3 which form part of a gating circuit GC1. The latter is connected between an input terminal ASS (CAM) and terminals ASS and $\overline{ASS}$ of the gating circuit GC4 which is built up by means of gates of the same type as NAND1, i.e. including a precharge and a validation circuit. Gating circuits GC2 and GC3 similar to GC1 are connected between input terminals ACT (CAM) and MMIE (CAM) and input terminals ACT, ACT and MMIE of GC4 respectively. In GC1 terminals ASS (CAM) and ASS are interconnected via the series connection of inverter I5, pass transistor PT∅2 and inverter I6, which is connected in a loop with inverter I7 and pass transistor PT∅3 so as to form a memory element. The output of PT∅2 is also directly connected to input $\overline{ASS}$ of GC4.

The gating circuit GC4 also has input terminals $\overline{FFFA}$, $\overline{FFFB}$, provided by FIFOAC and FIFOBC, $\overline{DMC∅}$ and DMC1, generated by DMC, MMIB of EXOR and $\overline{C4+}$. GC4 has outputs LF1 and LF2 which are 1 during a precharge time and ∅ during C4+ when the corresponding Boolean functions are 1. These Boolean functions are LF1 = $\overline{FFFA}$ . $\overline{DMC1}$ . $\overline{DMC∅}$ . MMIB . MMIE ($\overline{ACT}$+ACT . $\overline{ASS}$)

LF2 = $\overline{FFFB}$ . $\overline{DMC1}$ . $\overline{DMC∅}$ . MMIB . MMIE ($\overline{ACT}$=ACT . ASS)

wherein $\overline{DMC∅}$ . $\overline{DMC1}$=TS∅

The output terminals LF1 and LF2 are connected to output terminals WFIFOA and WFIFOB via a respective inverter I8, I9 and a pass transistor PT∅4, PT∅5 both controlled by C4— and $\overline{C4-}$. The like named write signals WFIFOA and WFIFOB are generated on these outputs.

DMCL includes a gating circuit GC5 similar to GC4 and having input terminals $\overline{FFFA}$, $\overline{FFFB}$, ACT, Ass, $\overline{ASS}$, DMC4/∅, $\overline{DMC4/∅}$ and $\overline{C4+}$ and output terminals LF3 and LF4 which are 1 during a precharge time and ∅ during C4+ when the corresponding Boolean functions are 1 These functions are:

LF3 = $\overline{DMC4}$ . $\overline{DMC3}$ . $\overline{DMC2}$ . $\overline{DMC1}$ . DMC∅

LF4=DMC4.DMC3.DMC2.DMC1.DMC∅.($\overline{\text{FFF-A}}$.FFFB+FFFA.ACT.$\overline{\text{ASS}}$+FFFB.ACT.ASS)

wherein $\overline{\text{DMC4}}$ . $\overline{\text{DMC3}}$ . $\overline{\text{DMC2}}$ . $\overline{\text{DMC1}}$ . DMC∅ defines time slot TS1 of bit ∅ and DMC4 . DMC3 . DMC2 . DMC1 . DMC∅ defines time slots TS3 of bit 7.

The output terminals LF3 and LF4 are connected to output terminals RCINOLD and WCIN via a respective inverter I1∅, I11 and a respective pass transistor PT∅6, PT∅7 both controlled by C4− and $\overline{\text{C4−}}$. The outputs of PT∅6 and PT∅7 control a respective PMOS transistor PM∅3, PM∅4 via a respective inverter I12, I13 and a respective pass transistor PT∅8, PT∅9 both controlled by C4+, $\overline{\text{C4+}}$. PM∅3 is connected in series with NMOS transistor NM∅5 between C4− and ground, NM∅5 being controlled by C4+. Likewise PM∅4 is connected in series with NMOS transistor NM∅6 between C4− and ground, NM∅6 being controlled by C4−. The terminals WCINOLD and RCIN are constituted by the junction points of PM∅3 and NM∅5 and of PM∅4 and NM∅6 respectively. The signals WCIN, RCIN, RCINOLD AND WCINOLD are generated at the like named outputs.

Mainly referring to FIG. 11, it is supposed that the bits ∅, 1, . . . of the scan byte relating to line L+1 are entered from the line CIN∅ into CINSIPO at each trailing edge of Cl+. During the time slots TS∅/3 of these bits the following happens when supposing that for the line L+1 concerned MMIE=1 and

ACT=ASS=∅, and that $\overline{\text{FFFA}}$=$\overline{\text{FFFB}}$=1

The bits DMC8/5 indicating the line identity are latched in the cells LC4/7 and the bits DMC4/2 indicating the position in the scan byte of the bit being checked or tested are latched in the cells LC∅/2.

Bit ∅

TS0, TS1: during these time slots the scan byte stored in CINSPO and the MMI data of bit 7 stored in latch circuit LCC and both concerning line L are entered in the DRAM and in the FIFOA and/or FIFOB respectively;

TS2: during this time slot the scan byte concerning line L+1 is read from the DRAM by RCINOLD and written in OLDCINPISO during the second half of TS2 under the control of WCINOLD. Indeed LF3=1 during TS1 of bit ∅;

TS3: during this time slot the bits ∅ of CINSIPO and OLDCINPISO are compared or tested. It is supposed that these bits are different so that the output MMIB of EXOR is 1. This output bit MMIB is supplied to GC4. Also bit ∅ of CINSIPO is latched in cell LC3 of latch circuit LCC so that this circuit then contains all MMI data of bit ∅ of line L+1. During the second half of this time slot and the first half of TS∅ of bit 1 and because RSTATUS=1 the CAM is then read in the way described above so as to obtain the status bits MMIE (CAM), ACT (CAM) and ASS (CAM) pertaining to line L+1.

Bit 1

TS∅: during the first half of this time slot the signal LSTATUS is 1 so that the last mentioned status bits are then applied to the gating circuit GC4 as a consequence of which the outputs LF1 and LF2 of GC4 become activated;

TS1: during the first half of this time slot the signals WFIFOA and WFIFOB and also the output signal R of NAND1 becomes activated so that the MMI data are read from LCC and written into both FIFOA and FIFOB.

The operation then continues in a similar way for all the other bits, but for bit 7 of line L+1, output LF3 of GC5 becomes ∅ as a consequence of which RCINOLD and WCINOLD become activated during bit ∅, TS∅ (second half) of line L+2. Also, due to this the whole scan byte of line L+1 stored in CINSIPO is now entered into the DRAM. During the following time slot TS1 the MMI data of the last bit 7 of line L+1 is entered in both FIFOA and FIFOB.

It should be noted that MMI data is stored in the latch circuit LCC for each new bit entering the CINSIPO, i.e. independently of the value of this bit. However, this MMI data is only stored in a FIFOA/B when the condition of this bit is different from the older one, since WFIFOA and WFIFOB are dependent on the EXOR output signal MMIB.

In the way already described above this MMI data is then transmitted to TCEA and for TCEB in a TOUT channel 16 under the control of the channel 16 processor CH16PR.

Reference is now made to FIGS. 12 to 16 for a more detailed description of the CAM, DMEM (FIGS. 12–14) and FFS (FIGS. 15–16).

The data memory DMEM has 16 rows of cells DM∅7/∅∅ to DM157/15∅ which are associated to respective ones of the lines TL∅ to TL15 and which are used to store data concerning these lines. The cells of each of the 16 columns are connected to a respective conductor of the 16-bit bus DF/D∅ and each row of cells further has a read and a write input R and W respectively.

The control memory CAM has 16 rows of cells C∅7/∅∅ to C157/15∅ which are also associated to respective ones of the lines TL∅ to TL15 and therefore also to respective pairs of LIN/LOUT line channels since two such LIN line channels N and N+16 and also two like named LOUT channels are permanently associated to each line L as already mentioned. These two LIN/LOUT line channels are never used simultaneously and the code of these two line channels includes the same 4-bit code as the line but further has a fifth code bit (MSBL) which is ∅ for N and 1 for N+16. The cells of each row of the CAM are used to store the following data for the corresponding line:

the MSBL (cells C∅7/157) of the corresponding LIN/LOUT line channel number. Because the 4 least significant bits of this line channel number are the same as those of the identity of the line associated to the row of the CAM, the bit MSBL and the row define the whole line channel number;

a TIN channel number (cells C∅6/∅2 to C156/152) allocated to this line by TCEA or TCEB;

an assignment bit ASS for this line (cells C∅1/151);

an activity bit ACT for this line (cells C∅∅/15∅).

From the above it follows that each row, associated to a line, of the CAM is adapted to store the MSBL of a LIN/LOUT line channel number and a TIN channel number both allocated to this line.

Data may be read from or written in the CAM via the conductors $\overline{\text{MSBL}}$, MSBL, $\overline{\text{CAM4}}$, CAM4 . . . $\overline{\text{ACT}}$, ACT connected to SP8 and FFS. To this end, the cells cf each of the rows of cells C∅7/∅∅ to C157/15∅ of the CAM have a common read/write input RW∅ to RW15 constituted by the output of a NAND gate NAND∅∅ to NAND15∅ which is of the same type as NAND1 described above. Each of these gates is controlled by a clock signal C4+, a R/W CAM signal provided by CH16PR and the line identity LI3/∅ provided by MUX4.

Data may also be written into DMEM from the 16-bit bus DF/D∅ or read from DMEM onto this bus, these data being received from TCEA/B during a TINA/B channel or from a line during a LIN line channel or having to be transmitted during a TOUT channel time or during a LOUT line channel to TCEA/B and to a line respectively. For this reason comparison means are associated to each row of the CAM for comparing a TIN or LOUT channel identity stored therein with a TIN or a LOUT channel applied to the input conductors $\overline{CHC4}$, CHC4 to $\overline{CHC\emptyset}$ CHC∅ and to select in function of the result of this comparison a corresponding row of DMEM wherein data has to be written or from which data has to be read. These means are described in detail hereinafter by making reference to FIGS. 13 and 14 which show cells C156 and C15∅ of FIG. 12 in detail. All the cells are of the same type as C156 except for those of the column C∅∅/15∅ which are of the same type as C15∅.

The cell such as C156, represented in FIG. 13 comprises a flipflop which is constituted by PMOS transistors PM1∅ and PM11 and NMOS transistors NM1∅ and NM11, the transistors PM1∅ and NM1∅ as well as PM11 and NM11 being connected in series betwen VCC and ground. The junction point of PM1∅ and NM1∅ which constitutes the output Q of the flipflop is connected to the interconnected gate electrodes of PM11 and NM11, and vice-versa for the output $\overline{Q}$ constituted by the junction point of PM1∅ and NM11. The outputs $\overline{Q}$ and Q are connected to conductors $\overline{CAM}$ and CAM4 via respective NMOS transistors NM12 and NM13 whose gate electrodes are controlled by the read/write input RW15. The outputs Q and $\overline{Q}$ also control pass transistors PT1∅ and PT11 in a reverse way. The data inputs of these transistors are connected to input conductors $\overline{CHC4}$ and CHC4 and their outputs are commoned to a single output terminal 0156.

The cell circuit of FIG. 13 operates as follows:
by activating RW15 the transistors NM12 and NM13 become conductive so that the state of the flipflop may either be read or changed via conductors $\overline{CAM4}$;
the pass transistors PT1∅ and PT11 are used to compare the conditions of $\overline{CHC4}$, CHC4 with those of the flipflop i.e. with $\overline{Q}$ and Q. Indeed:
when Q=1 and $\overline{Q}$=∅, PT11 is conductive so that the output 0156 is brought in the same condition as CHC4;
when $\overline{Q}$=1 and Q=∅, PT1∅ is conductive so that the output 0156 is brought in the same condition as $\overline{CHC4}$;

This means that when CHC4 and $\overline{CHC4}$ is in the same condition as Q and $\overline{Q}$ the output is 1, whereas it is ∅ in the other case.

The cell such as C15∅ shown in FIG. 14 is similar to that of FIG. 13 and includes transistors PM12, PM13 and NM14 to NM17, but has no comparison transistors such as PT1∅ and PT11. The output 015∅ is the Q-output of the flipflop.

The conductors $\overline{CAM4}$, CAM4 to $\overline{CAM\emptyset}$, CAM∅ of the cells of the columns C∅6/156 to C∅2/152 are commoned and connected at their lower ends to SP8 via CAMs and FFS and the input address conductors $\overline{CHC4}$, CHC4 to $\overline{CHC\emptyset}$, CHC∅ of these cells are also commoned and connected at their upper ends to CHAC. The conductors $\overline{MSBL}$, MSBL of the cells of the column C∅7/57 are commoned and connected to FFS at their lower ends, whilst input conductors of these cells are connected to $\overline{CHC4}$ and CHC4. The conductors $\overline{ASS}$, ASS of the cells of the column C∅1/151 are commoned and connected to their lower ends to A/B and A/B of CH16PR via CAMS. Their input conductors are connected to outputs $\overline{A/B}$ and A/B of the time slot allocation circuit TSALL which makes these outputs alternately equal to 1. Finally, the R/W conductors $\overline{ACT}$, ACT or C∅∅/15∅ are connected at their lower ends to SP8.

Each of the row of the CAM is associated to two NAND-gates of the same type as NAND1 and whose outputs are connected to the read and write inputs R and W of a corresponding row of cells of DMEM via a corresponding inverter U∅, T∅ to U15, T15 respectively. For instance:
row C∅7/∅∅ is associated to:
a first gate comprising the series connected NMOS transistors N∅8, N∅∅/∅6, N∅9, N∅1∅ and PMOS transistor R∅;
a second gate comprising the series connected NMOS transistors M∅8, M∅∅/∅5, M∅7, M∅9, M∅1∅ and PMOS transistor S∅;
row C157/15∅ is associated to
a first gate comprising the series connected NMOS transistors N158, N15∅/156, N159, N151∅ and PMOS transistor R15;
a second gate comprising the series connected NMOS transistors M158, M15∅, M152/155, M157, M159, M151∅ and PMOS transistor S15.

The transistors N∅8/158, M∅8/158; N∅9/159; M∅9/159; N∅1∅/151∅; M∅1∅/151∅; and R∅/15, S∅/15 are controlled by C4− ETCE; ELIN; WDP; RDP and C4− respectively. The outputs of N∅9 and M∅9 to N159 are interconnected.

The outputs 0∅∅/∅6 to 015∅/156 of the cells C∅∅/∅6 to C15∅/156 each control a corresponding NMOS transistor of the first gates. The outputs 0∅7/157 of the cells C∅7/157 each control a corresponding NMOS transistor M∅7/157 of the second gates, other NMOS transistors of which are controlled by $\overline{CHC3}$, CHC3 to $\overline{CHC\emptyset}$, CHC∅ in such a way that the transistors associated to the rows ∅ to 15 become conductive for the codes ∅∅∅∅ i.e. $\overline{CHC3}=\overline{CHC2}=\overline{CHC1}=\overline{CHC\emptyset}=1$ to 1111 i.e. CHC3=CHC2=CHC1=CHC∅=1 respectively.

The line channel assignment circuit FFS shown in FIG. 15 includes an adder circuit FA with cells FA4/∅ having adder inputs X4/∅ and Y4/∅ and sum outputs S4/∅ and $\overline{S4/\emptyset}$. The latter are connected to terminals FF4/∅ and $\overline{FF4/\emptyset}$ of the cells SP84/8∅ of the register SP8 via NMOS transistors NM54/5∅ and NM64/6∅. The latter are all controlled by a read signal RFA provided by CH16PR. SP8 moreover includes the cells SP84/87 and is controlled by the read and write signals RSP8C4−, WSP8C4−, RSP8C4+ and WSP8C4+ also generated by CH16PR. SP8 is further connected to the 8-bit bus BB7/∅.

FFS has terminals MSBL; $\overline{MSBL}$; CAM4/∅, $\overline{CAM4/\emptyset}$, CHC4/∅, A/B, $\overline{A/B}$ ACT and $\overline{ACT}$ which are connected to terminals $\overline{MSBL}$, MSBL, ..., ACT and $\overline{ACT}$ of the CAM via the CAM switches CAMS1 and CAMS2 wherein an inversion is performed and which are controlled by RSP8C4+, WSP8C4+ above mentioned and MSBLVALC4+ also generated by CH16PR respectively.

The terminals $\overline{A/B}$ and A/B are connected to like named terminals of CH16PR and $\overline{ACT}$ and ACT are coupled to like named outputs of cell SP85 of SP8.

In FFS the sets of terminals $\overline{CAM\emptyset}$, CAM$\emptyset$, CHC$\emptyset$, CC$\emptyset$ to $\overline{CAM3}$, CAM3, CHC3, CC3 are connected in a similar way to SP8$\emptyset$ to SP84 and therefore only the connection of the terminals $\overline{CAM\emptyset}$, CAM$\emptyset$, CHC$\emptyset$, CC$\emptyset$ and $\overline{CAM4}$, CAM4, CHAC4 is considered hereinafter. To be reminded that CC3/$\emptyset$ define a line identity provided by CH16MDEC.

CAM$\emptyset$ and $\overline{CAM\emptyset}$ are directly connected to FF$\emptyset$ and $\overline{FF\emptyset}$ respectively. CAM$\emptyset$ is also connected to input terminal X of FA$\emptyset$ via pass transistor PT2$\emptyset$ controlled by the write signals $\overline{WFA}$ and WFA (FIG. 16) provided by CH16PR. CHC$\emptyset$ is connected to input terminal Y of FA$\emptyset$ via the series connection of inverter I2$\emptyset$, pass transistor PT3$\emptyset$, inverter I3$\emptyset$ and pass transistor PT4$\emptyset$. CC$\emptyset$ is connected to the same terminal Y via inverter I4$\emptyset$ and pass transistor PT5$\emptyset$ in series, PT4$\emptyset$ and PT5$\emptyset$ being both controlled by signals STARTFFS and $\overline{STARTFFS}$. The latter signal also controls the carry input of FA. Finally, CC$\emptyset$ is also connected to FF$\emptyset$ via NMOS transistor NM2$\emptyset$, to $\overline{FF\emptyset}$ via inverter I4$\emptyset$ and NMOS transistor NM3$\emptyset$, both NM2$\emptyset$ and NM3$\emptyset$ being controlled by signal FFW provided by CH16PR. Pass transistor PT3$\emptyset$ is controlled by signals provided by a gate G comprising PMOS transistor PM4$\emptyset$ and NMOS transistors NM4$\emptyset$ to NM44. PM4$\emptyset$ is connected in series with NM4$\emptyset$ and NM41 between VCC and ground and NM42 and NM43 are connected in parallel with NM4$\emptyset$ and NM41. PM4$\emptyset$ and NM44 are controlled by C4−, whilst NM4$\emptyset$, NM41, NM42 and NM43 are controlled by L−B, $\overline{A/B}$, L−A and A/B respectively. The output of G is connected to PT3$\emptyset$ directly and inverter I5$\emptyset$ respectively.

The circuitry associated to $\overline{CAM4}$, CAM4 and CHC4 differs from the one described above by the fact that VCC is continuously applied to PT54 and that output $\overline{S4}$ of FA4 is connected to MSBL directly, to CAM4 via NMOS transistor NM24 controlled by FFW, to $\overline{MSBL}$ via inverter I6$\emptyset$ and via the same inverter I6$\emptyset$ and NMOS transistor NM34 to $\overline{CAM4}$ and $\overline{FF4}$, transistor NM34 being also controlled by FFW.

The operation of the above circuitry is as follows, it being supposed that a TW instruction has been received in channel 16 of TINB and that it has already been checked that a line e.g. TL$\emptyset$ has been selected and that the byte received is a BYTE1.

As already described above, the processor then transfers part of the contents of IRB, i.e. ACT=1 and a TINB channel number, e.g. CH31, to SP8 under the control of the signals R8B and WSP8C4− which read the contents of IRB and place them on the 8-bit bus BB7/$\emptyset$ and write these contents in the register SP8 from this bus. Together with these data also the assignment bit ASS=$\overline{A/B}$=1 is written in the CAM, this bit indicating that the line TL$\emptyset$ is allocated to TCEB. The processor CH16PR also issues a R/WCAM signal to read the contents of SP8 via CAMS controlled by RSP8C4+ and write these contents in the CAM at the line address LI3/$\emptyset$ e.g. $\emptyset\emptyset\emptyset\emptyset$ of TL$\emptyset$ provided at the output of MUX4 due to RSTATUS being $\emptyset$. This write operation is executed because the output RW$\emptyset$ of the NAND gate NAND$\emptyset\emptyset$ (FIG. 12) associated to row $\emptyset$ of the CAM is then deactivated.

After having checked the activity bit ACT received the processor then starts a first free search operation by generating a STARTFFS signal (FIG. 16) and applying it to FFS together with the selection signal A/B which is supposed to be $\emptyset$, as already mentioned. At the moment L−B provided by TSALL is 1 the value CHC4/$\emptyset$ provided by CHAC is equal to the difference of the LOUT line channel number DMC8/$\emptyset$ provided by DMC and the time coincident TINB channel number BMC8/4 generated by BMC. It is supposed that this difference L−B is equal to 2, i.e. CHC4/$\emptyset$ =$\emptyset\emptyset$1$\emptyset$.

Due to STARTFFS=1 the pass transistors PT44/4$\emptyset$ are conductive and because L−B=1 and $\overline{A/B}$=1 the output of gate G is de-activated so that also pass transistors PT34/3$\emptyset$ are conductive. As a consequence CHC4/$\emptyset$ is applied to the adder inputs X of FA4/$\emptyset$ via inverters I2$\emptyset$/24, pass transistors PT3$\emptyset$/34, inverters I3$\emptyset$/34 and pass transistors PT4$\emptyset$/44.

During STARTFFS=1 also a signal WFA (FIG. 16) is activated so that also pass transistors PT24/2$\emptyset$ are conductive and because RSP8C4+=1 the TINB channel number CH31 stored in SP84/8$\emptyset$ and provided at the outputs FF$\emptyset$/4 thereof is applied to the adder inputs X of FA4/$\emptyset$.

The adder FA then calculates the sum, modul 32, of the present TINB channel number CH31=11111 and the above difference 2 =$\emptyset\emptyset\emptyset$1$\emptyset$ in order to obtain at its outputs S4/$\emptyset$ the LOUT line channel number which is time coincident with the TINB channel number CH31. This line channel number is therefore CH1 and S4/$\emptyset$=$\emptyset\emptyset\emptyset\emptyset$1.

Afterwards both the signals WFA and RFA are activated. As a consequence the latter value $\emptyset\emptyset\emptyset\emptyset$1 and the complement thereof are applied via the conductors FF4/$\emptyset$, $\overline{FF4/\emptyset}$ and the respective transistors NM54/5$\emptyset$ and NM64/6$\emptyset$ to SP8.

The value $\emptyset\emptyset\emptyset\emptyset$1 is also applied via FF4/$\emptyset$ to the adder inputs X of FA for a new operation. In this operation the line number $\emptyset$, CC3, CC2, CCl, CC$\emptyset$, e.g. $\emptyset\emptyset\emptyset\emptyset\emptyset$ of TL$\emptyset$, is now subtracted from the above value $\emptyset\emptyset\emptyset\emptyset$1 by adding the two's complement of this number to this result. This two's complement is obtained at the outputs of the pass transistors PT43/$\emptyset$3 because CC3/$\emptyset$ is inverted by I43/4$\emptyset$, VCC is directly applied to PT54 and the carry input of FA$\emptyset$ is activated at the end of STARTFFS because then $\overline{STARTFFS}$=1. From these pass transistors the two's complement is applied to the adder inputs Y of FA which calculates the sum. If this sum is at least equal to 16 the output $\overline{S4}$ or MSBL of FA4 is $\emptyset$ and in this case the LOUT line channel number is $\emptyset$ CC3 CC2 CCl CC$\emptyset$ On the contrary, if this sum is smaller than 16 —as is now the case because it is equal to $\emptyset\emptyset\emptyset\emptyset$1 the output $\overline{S4}$ of FA4 and MSBL is 1 and in this case the LOUT line channel number is 1 CC3 CC2 CCl CC$\emptyset$ i.e. 1 $\emptyset$ $\emptyset$ $\emptyset$ $\emptyset$ or CH16.

Under the control of signal MSBLVALC4+ provided by CH16PR this bit MSBL is written in the CAM and more particularly in the first cell of the row $\emptyset$ which is assigned to TL$\emptyset$ and for which the write input RW∅/15 is ∅. This write input is activated by the NAND-gate NAND∅∅ controlled by the line number LI3/∅ or CC3/∅. Thus a LOUT line channel number CH16 is assigned to the TINB channel number CH31 already stored in row ∅ together with the bits ACT and ASS.

When for instance speech information intended for TL∅ is received on the 16-bit bus DF/D∅ from TCEB in the TINB channel CH31 allocated to TL∅ and has to be transmitted to TL∅ on the LOUT channel CH16 assigned to TL∅ and stored in row ∅ of the CAM the following happens. Hereby:

the LOUT line channel number CH16 is 1 ∅ ∅ ∅ ∅;
the TINB channel number CH31 is 1 1 1 1 1 ;

TSALL activates the signals ETCE and WDP and therefore enables part of the data on the 16-bit bus DF/D∅ to be written in DMEM. By these signals the transistors N∅9/159 and N∅1∅/151∅ are made conductive. When the above mentioned TINB channel number 1 1 1 1 1 is applied to the inputs CHC4 to CHC∅ of the CAM the various bits thereof are compared with the bits stored in the cells C∅6/∅2 to C156/152 and since 1 1 1 1 1 is stored in cells CC∅6/∅2 of row ∅ of CAM, only the transistors N∅2 to N∅6 become conductive. Because moreover the activity bits correspond also the transistor N∅∅ is conductive and this is also true for N∅1 when A/B*=1. For this reason, when C4—=1 also N∅8 becomes conductive as a consequence of which the write inputs W of the row of cells DM∅7/∅∅ of DMEM becomes activated. By this signal part of the data stored on the 16-bit bus are written in DMEM.

Afterwards TSALL activates the signals ELIN and RDP and therefore enables data to be read from DMEM and to be written on the 16-bit bus DF/D∅. By these signals the transistors M∅9/159 and M∅1∅/151∅ are conductive.

When the LOUT line channel number 1 ∅∅∅∅ is applied to the inputs CHC4 to CHC∅ of the CAM the transistors M∅2 to M∅5 become conductive and the same is true for M∅∅ because ACT=1. For this reason, when C4—=1 also M∅8 becomes conductive as a consequence of which the write input R of the row of cells DM∅7/∅∅ of DMEM becomes activated. By this signal the data in this row is written on the 16-bit bus DF/D∅.

Reference is now made to FIGS. 17 to 20 for a detailed description of the priority circuit CLHB. The latter includes a finite state machine FSM the various states of which are represented in FIG. 20 and the details of which are shown in FIG. 17. The FSM has input terminals C1B, $\overline{C1B}$, C2B, $\overline{C2B}$, CLIB, POB, $\overline{POB}$, SSB, $\overline{SSB}$, FRB, $\overline{FRB}$, EOPCB, SOPCB and TS2,3B to which like named input signals are applied. FSM has output terminals Z∅, Z1 and Z2 on which appear like named output signals defining seven possible states, i.e. ∅∅∅ or ∅, ∅∅1 or I, . . . , 11∅ or VI of the FSM.

The FSM includes an array of NAND-gates and NOR-gates arranged in columns in the lower part of FIG. 17 and in rows in the upper part of this figure respectively. Each NAND-gate, such as the two shown, is connected between VCC=5V and ground and comprises the series connection of a PMOS transistor PM7∅, PM71 controlled by input signal TS2,3B and a plurality of NMOS transistors NM7∅/75, NM76/81 controlled by one or more of the above mentioned input and output signals. More particularly, the output signals Z∅, Z1, Z2 control the pairs of NMOS transistors NM72, NM78; NM71, NM77 and NM7∅, NM76 via inverters I99, I1OO, I1O1 pass transistor PT6∅, PT61, PT62 and inverters I7∅, I71, I72 respectively. The input signal CLIB controls NAND-gates (not shown) of the array via inverter I73 and pass transistor PT63 controlled by TS∅, $\overline{TS∅}$ and further directly or via inverter I74. The output of each NAND-gate is constituted by the junction point of PM7∅, PM71 and NM7∅, NM71 and is connected via inverter I75, I76 to the gate electrodes of one or more NMOS transistors NM82/83, NM84. Each of the latter transistors forms part of a NOR-gate of an array of five NOR-gates, the constituent NMOS transistors of each NOR-gate being connected between two row wires x1, y1 to x5, y5. More particularly NM82, NM83 and NM84 are connected between x4 and y4, x5 and y5 and x3 and y3 respectively. Each of the row wires y1/5 is connected to ground via the series connection of two NMOS transistors. The first of these transistors are controlled by TS2,3B and the second by a reset signal MAIN-RESETB via an inverter I77. More particularly y3, y4 and y5 are connected to ground via the series connected NMOS transistors NM85/86; NM87/88 and NM89/9∅ respectively.

The row wires x1/5 are each connected to VCC via a PMOS transistor PM72/76 controlled by TS2,3B. The row wires x1 and x2 are further connected to output terminal ESB, and MTB via inverter I78 and I79 respectively and the row wires x3, x4 and x5 are connected to the output terminals Z∅, Z1 and Z2 via inverters I8∅, I81, I82 and pass transistors PT63, PT64 and PT65 which are controlled by input signals TS2B and $\overline{TS2B}$.

The state diagram of FIG. 20 clearly shows how the FSM goes from one state to the other under the control of the above mentioned input and output signals. For instance, when FSM is in the state I:
it remains in this state as long as $\overline{SSB.EOPCB}$=1;
it evolves to state VI when SSB.POB=1.
This also follows from FIG. 17 when considering what happens during TS∅B, TS2B and TS2,3B being equal to TS2B+TS3B.

TS∅B: during this time slot the values of Z2, Z1 and Z∅ are applied to NM7∅,76; NM71,77 and NM72,78 respectively and since FSM is in the state I wherein Z2=Z1=∅ and Z∅=1 the gate electrodes of all these transistors NM7∅/72 and NM76/78 are activated. This condition remains for one channel time i.e. until the next TS∅. Also the input signal CLIB is applied to the corresponding NAND-gates (not shown) via pass transistor PT63.

$\overline{TS2,3B}$: outside time slots TS2 and TS3, VCC is applied to the outputs of the above NAND-gates, due to which all the NOR-gates are inhibited, and also to all outputs ESB, MTB, Z∅, Z1, Z2 via PM78 to PM82 respectively;

TS2,B: during this time slot the AND-gates transistors NM85, NM87 and NM89 and the pass transistors PT63/65 become conductive. On the contrary PM72/76 are blocked. Because FSM is in the state I wherein Z2=Z1=∅ and Z∅=1 the output of the NAND-gate including PM7∅ is grounded when POB.SSB=1, whereas the output of the NAND-gate including PM71 is grounded when $\overline{SSB}$. $\overline{EOPCB}$=1. In the first case transistors NM82/83 are made conductive and in the second case transistor NM84 is made conductive. As a consequence the output Z1 and Z2 are activated in the first case, whereas output Z∅ is activated in the second case. This means that in the first case the new state Z2Z1Z∅ becomes VI or 11∅, whilst in the second case FSM remains Z2Z1Z0 = 001 or I. This is also shown on the state diagram of FIG. 20.

TS3B: during this time slot NM85, NM87, NM89 remain conductive and PM72/75 remain blocked.

The above mentioned input signals are generated in the way described hereinafter by making reference to FIGS. 18 and 19.

A gating circuit GC6 includes a plurality of NAND-gates which operate in a similar way as those of the FSM described above. The input signals of GC6 are; VCC and C4B−;
$\overline{DMC0}$, DMC0, $\overline{DMC1}$, DMC1, $\overline{DMC2}$, DMC2, $\overline{DMC3}$ provided by the counter DMC;
SSB, $\overline{SSB}$, FRB already mentioned above;
SOPSCANB which is activated upon an instruction SOPSCAN being received from TCEB;
an input signal II+III which is generated as follows by the NAND gate NAND3 which is controlled by Z1, $\overline{Z2}$ (and $\overline{C4B+}$ and whose output is connected to the input II+III of GC6 via inverter I83, pass transistor PT66, inverter I84, pass transistor PT67 and inverter I85. When C4B+ becomes 0 then the gate output becomes grounded if Z1=$\overline{Z2}$)=1 i.e. for the state II or III of FSM. In this case the input II+III of GC6 becomes activated after the pass transistors PT66 and PT67 controlled by C4B− and C4+ have successively become conductive.

With these input signals GC6 generates the following output signals:

TS0B = $\overline{DMC3.DMC2.DMC1.DMC0}$;

TS2B = $\overline{DMC3.DMC2}$.DMC1.DMC0;

TS2.3B = $\overline{DMC3.DMC2}$.DMC1

WPNTB = TS0B.SOPSCANB;

LSTRB = TS1B.SSB + TS5B. (II + III)

RPNTB = TS1B.$\overline{SSB}$. (IV + V);

IPNTB = TS3B.(II + III);

ROBB = TS4B.(II + III);

A latching circuit LC (FIG. 14) latches the following signals during time slot TS0 so that these signals remain until the following time slot TS0:

SOPCB = SOPB.TS0B;

EOPCB = EOPB.TS0B;

SSB = SOPSCANB.TS0B;

FRB = CH17B.TS0B:

wherein SOPB is a signal which is activated when start of packet instruction is received from TCEB.

EOPB is a signal which is activated when an end of packet signal is received from TCEB.

SOPSCANB is a signal which is activated when a start of scan signal is received from TCEB.

CH17B is a signal which is on 1 during TS0B of channel 17 of TINB.

The signals LSTRB and WPNTB control the select inputs of a multiplexer circuit MUX5 (FIG. 18) having a first set of inputs S04/00 defining the identity of DPTC0 and a second set of inputs TIB3/0 and 0 defining a base address i.e. the identity of an arbitrary DPTC among DPTC0/31 to which priority is given first for signaling MMI data to TCEA and/or TCEB. The outputs CLB4/0 of the muliplexer MUX5 are connected to inputs of corresponding cells of a latching circuit LC controlled by the signals ROBB and WOBB, to the inputs of corresponding cells of a pointer circuit PNTB controlled by the signals WPNTB, RPNTB and IPNTB and to first inputs of corresponding Exclusive-NOR gates EXB4/0 constituting a comparator CO with output CO. The second inputs of these gates are connected to outputs of the cells of PNTB.

The signals WPNTB and RPNTB control the parallel connected transistors NM91 and NM92 (FIG. 19) which are connected between VCC and ground and in series with PM77 and NM93, the junction point of PM77 and NM91, NM92 being connected to the gate electrodes of PM78 and NM94 which are connected in series between VCC and ground, PM77 and NM93 are controlled by C4B−. Output signal WOBB which is hence equal to WPNTB+ RPNTB appears at the output terminal WOBB between PM78 and NM94.

The signals CO, ROBB and LSTRB are further used to generate the signals C1B and C2B on the like named terminals in the following way (FIG. 19):

CO is applied to terminal C1B via inverter I86, pass transistor PT68 controlled by ROBB and $\overline{ROBB}$ and inverters I87 and I88 connected in anti-parallel so as to form a memory element;

CO is applied to terminal C2B via inverter I89, pass transistor PT69 controlled by LSTRB and $\overline{LSTRB}$ and inverters I90 and I91 also connected in anti-parallel.

The above input signal POB is provided at the output of a packet length counter PLC (FIG. 19) having preset inputs PR1 and PR2 and an increment input I. Preset input PR1 is connected to the junction point of transistors PM79 and NM95 whose gate electrodes are respectively controlled by C4B+ and by the output signal of NAND-gate NAND4. The latter has inputs SOPB and $\overline{P1}$ to which a like named preset signal is applied. Preset input PR2 is controlled in a similar way by preset signal P1 and SOPB via NAND-gate NAND5, PM80 and NM96. Also the increment input I is controlled in a similar way by $\overline{SOPB}$ and CH17B via NAND gate NAND6, PM81 and NM97. In this way the counter PLC is preset to a first value if the output of NAND4 is de-activated i.e. when $\overline{P1}$=1 and SOPB=1 and to a second value if the output of NAND5 is de-activated, i.e. when P1=0 and SOPB=1. The counter PLC is incremented each time the output of NAND6 is de-activated, i.e. when SOPB=0 and CH17B=1.

The input signal CLIB is obtained as follows (FIG. 19). The conductor CLB which is common to all DPTC0/31 is connected to the junction point of NM98 and resistor R0B which are connected in series between ground and VCC and this junction point is connected to the above mentioned input terminal CLIB via inverter I92. The output of NOR-gate NOR is connected to the gate electrode of NM98 via inverters I93 and I94 in series. A first input of NOR is controlled by the outputs Z0, Z1 and Z2 (via inverter I95) of the FSM via NAND-gate NAND7. A second input of NOR is controlled by the output signal FFEB of FIFOAC via inverters I96, I97 and pass transistor P70 in series, P70 being controlled by the output of NAND7 directly and through inverter I98. Finally, the third input of NOR is controlled by the Q-output of flipflop FF1 to the input of which the input signal SOPSCANB is supplied. In this way the output of NOR is activated and accordingly transistor NM98 becomes conductive when simultaneously:
$\overline{FFEB}=1$, i.e. when FIFOB is not empty, meaning that MMI data has been transmitted to TCEB;
$\overline{Q}=\emptyset$ i.e. when a SOPSCANB signal has been received;
$Z\emptyset1Z2=1$ i.e. when FSM is in state III.

When NM98 of DPTC$\emptyset$ is conductive the conductor CLB is grounded so that the input terminal CLIB is on 1 in all DPTC$\emptyset$/31.

These DPTC$\emptyset$/31 are thus informed of the fact that somewhere there is a DPTC which is the state III and wants to transmit MMI data to TCEB.

CLHB finally also includes flipflops FF2 and FF3 which are controlled by the output signals MTB and ESB of GC4 and provide the output signal MYTURNB and EOPSCANB respectively.

Before describing the operation of the priority circuit CLHB of DPTC$\emptyset$ in detail, this operation is briefly explained below. It is supposed that the packet length counter has not yet reached its end position wherein POB=1.

First part TIB3/$\emptyset$ of a base address BA is communicated to all DPTC$\emptyset$/31 by means of a SOPSCANB instruction and completed by $\emptyset$ to form the base address BA=TIB3/$\emptyset$, $\emptyset$ This address is stored in each DPTC in a latch circuit L and in a pointer circuit PNTB.

During each channel time and in each DPTC$\emptyset$/31 the own identity is compared with the base address BA and afterwards the contents of PNTB are incremented by 1 if no MMI information has to be transmitted to TCEB. In the DPTC for which the own identity is equal to the base address BA the request priority (C2B=1) is granted i.e. the request to ask for the transmission of MMI information in channel 16 of TOUTB. In this way such a request priority is granted successively to all DPTC. In the DPTC having request priority the FSM is brought in the state III, whereas the FSM of the other DPTC is brought in the state II. If in the DPTC with request priority also the request signal $\overline{FFEB}=1$ then the grant priority signal CLIB=1 due to which the FSM is brought in the state V. In the DPTC with request priority the FSM waits for the following frame (FRB=1) to step to the state II and to communicate to processor CH16PR and by means of a reset signal MYTURNB that MMI information has to be transmitted. In the other DPTC the FSM goes to the state IV and afterwards returns to the state II together with the FSM of the DPTC which has had priority.

In the states IV and V the PNTB is no longer incremented and this is also the case for all other states, except II and III. This means that after priority has been granted to a DPTC and the latter wants to transmit MMI information one waits until the following frame to again step PNTB and to thus grant a new priority.

In order that the priority granting should not continue indefinitely, in each CLHB it is checked if all DPTC have at least had priority since the last transmission of MMI information and in case none of the DPTC has to send such information in all DPTC the FSM is brought in the zero state. All this happens by making the contents of the latch circuit L equal to these of PNTB when a DPTC has priority and wants to transmit MMI information (state V) and after PNTB has been incremented by 1. These contents are compared with those of PNTB during each channel time and when the comparison is successful a signal C1B=1 is generated in each DPTC to bring FSM in the zero state.

The operation of CLHB is now described in detail.

Hereby it is supposed that in DPTC$\emptyset$, FIFOB is not empty, as indicated by $\overline{FFEB32}$ 1 and that all other DPTC1/31 $\overline{FFEB}=\emptyset$.

It is supposed that the following happens during various channel successive tiles on TINB.

(1) Channel 16

During such a channel 16 the start of packet instruction is received from TCEB, and decoded in DCEB as a result of which the output SOPB thereof is activated.

(2) Channel 17

During the time slots of this channel the following happens:

TS$\emptyset$B the packet length counter PLC is preset to the above mentioned first or second value depending on $\overline{P1}=1$ or P1=1;
FRB=CH17B.TS$\emptyset$B=1. Thus signal CH17B is latched until the following TS$\emptyset$B, but now FRB has no influence;
SOPCB=SOPB.TS$\emptyset$=1;

TS2B

FSM is brought from state $\emptyset$ into state I because SOPCB=1.

(3) Channel 16

During a following channel 16 of TINB an input instruction SOPSCANB is received and decoded in DECB. As a result the output SOPSCANB of DECB is activated and the bits TIB3/$\emptyset$ defining part of the above mentioned base address BA included in this instruction are applied to the like named inputs of the multiplexer MUX5 (FIG. 18).

(4) Channel 17

During the time slots of this channel the following happens:

TS$\emptyset$B

PLC is incremented by 1;
SSB=SOPSCANB.TS$\emptyset$B=1;
FRB=CH17B.TS$\emptyset$B=1;
so that signals SSB and FRB are present until the occurrence of the following TS$\emptyset$B;
WPNTB=SOPSCANB.TS$\emptyset$B=1
WOBB=WPNTB+RPNTB=1

By WOBB and WPNTB the complete base address BA=TIB3/$\emptyset$, $\emptyset$ applied to MUX5 is written in both the latch circuit and the pointer PNTB.

TS1B

LSTRB=TS1B.SSB+TS5B.(II+III)=1 because SSB=1. By this signal the identity S$\emptyset$4/$\emptyset\emptyset$ of DPTC$\emptyset$ is fed to the outputs CLB4/$\emptyset$ of MUX5 and from there to the one inputs of the comparator CO. It is supposed that this identity is equal to the base address BA which is stored in pointer PNTB and applied to the other inputs of CO. This means that DPTC$\emptyset$ has priority to possibly transmit MMI information to TCEB in TINB channel 16. In this case the output CO is activated and an output signal C2B=1 is generated at the output C2B of the inverters 19∅, 191 (FIG. 19).

TS2B

Due to C2B=1 and SSB=1 and supposing that the PLC counter has not yet reached its end position so that $\overline{POB}$=1, the FSM is brought in state III. Because FFEB=1, transistor NM98 becomes conductive so that a ground is applied to common line CLB. As a consequence the input CLIB=1 in all DPTC∅/31 so that these know that there is a DPTC which has priority and which wants to transmit MMI data to TCEB in TINB channel 16.

TS3B

IPNTB=TS3B.(II+III)=1 because FSM is in state III. By this signal the contents of PNTB are incremented by 1 so that the address BA+1 is now stored therein.

TS4B

ROBB=TS4B.(II+III)=1 because FSM is in state III. By this signal the base address BA stored in L is compared with the address BA+1 stored in PNTB. As a consequence the output CO of the comparator becomes ∅ and the same is true for the output C2B. Also the output C1B remains on ∅.

TS5B

LSTRB=TS1B.$\overline{SSB}$+TS5B.(II+III)=1 because FSM is in state III. By this signal the identity of DPTC∅ is compared with the address BA+1 stored in PNTB. Since this DPTC identity is equal to BA the output CO of the comparator is ∅.

(5) Channel 18

During TS2B of this channel the FSM is brought in the state V because $\overline{C1B}$=1 and CLIB=1 and remains in this state as long as $\overline{FRB}$=1, i.e. until the following channel 17.

(6) Channels 19, 20, . . . 31, ∅, . . . , 16

During TS1B of these channels one has:
RPNTB=TS1B.$\overline{SSB}$ (IV+V)=1 because FSM is in state V;
WOBB=RPNTB+WPNTB=1.
As a consequence the address BA+1 stored in pointer PNTB is each time read from PNTB and written in L so that the latter then stores BA+1.

(7) Channel 17

TS∅B: $\overline{SSB}$=1 and FRB=1;
TS1B: RPNTB=TS1B.$\overline{SSB}$ (IV+V)=1 because FSM is in state V WOBB=RPNTB+WPNTB=1; Again BA+1 is written in PNTB;
TS2B: FSM is brought in state II because FRB=1 and on condition that $\overline{POB}$=1, as is supposed, and an output signal MTB=1 is generated. As a result flip-flop FF2 is triggered to the condition wherein its Q-output MYTURNB is activated;
TS3B: IPNTB=TS3B.(II+III)=1 because FSM is in state II. Thus the pointer PNTB is incremented by 1 so that its contents become equal to BA+2.
TS4B: ROBB=TS4.(II+III) By this signal the address BA+1 stored in L is compared with the address BA+2 stored in PNTB and because these addresses are different the output CO of the comparator is ∅ and the same is true for C1B;
TS5B: LSTRB=TS1B.SSB+TS5B.(II+III)=1 because FSM is in state II. As a result the identity of DPTC∅ is compared with BA+2 and because these addresses are different the output signal C2B=∅.

(8) Channel 18

TS2B: FSM remains in the state II because CLIB=∅ as it was supposed that in all other DPTC1/31 FFEB=∅ so that $\overline{CLIB}$=1 and because $\overline{C1B}$=$\overline{C2B}$=1;
TS3B: IPNTB=TS3.(II+III)=1 so that the address then stored in PNTB is incremented by 1 so as to become equal to BA+3;
TS4B: ROBB=TS4B.(II+III)=1 because FSM is in state II; C1B remains on ∅.
TS5B: LSTRB=TS1B.SSB+TS5B.(II+III)=1 because FSM is in state II. Therefore the identity of DPTC∅ is compared with BA+3 so that C2B=∅.

(9) Channels 19, 20, . . . channel 15

During the time slots of each of these channels the following happens:
TS2B: FSM remains in the state II;
TS3B: IPNTB=TS3B.(II+III)=1 so that the address then stored in PNTB is made equal to BA+4, BA+5, etc . . . until BA+32=BA.
TS4B: ROBB=TS4B.(II+III)=1 as a result of which C1B=∅;
TS5B: LSTRB=TS1B.SSB+TS5B.(II+III)=1. Therefore the identity of DPTC∅ is compared with BA+4, BA+5, . . . , BA so that C2B=∅. . . , C2B=1.

(10) Channel 16

TS2B: FSM is brought in state III because

C2B=$\overline{C1B}$=$\overline{CLIB}$=1;

TS3B=IPNTB=TS3B.(II+III)=1 due to which the address stored in PNTB is incremented so as to become equal to BA+1;
TS4B: ROBB=TS4B.(II+III)=1 as a result of which the contents of L and PNTB are compared. Because both are equal to BA+1 the output C1B=1;
TS5B: LSTRB=TS1B.SSB+TS5B.(II+III)=1. As a result C2B=∅.

(11) Channel 17

TS2B: FSM is brought from the state II into the state ∅ because C1B=$\overline{CLIB}$=1 and a signal EOPSCANB or ESB is generated to inform CH16PR that DPTC∅ has no MMI information to be transmitted.
The operation of CLHB of another DPTC, e.g. DPTC1, during the above considered channels is described hereinafter.
(1) Channel 16: same operation as DPTC∅;
(2) Channel 17: same operation as DPTC∅
(3) Channel 16: same operation as DPTC∅;
(4) Channel 17: p1 TS1B: The identity of DPTC1 is compared with BA as a result of which C2B=∅;
TS2B: FSM is brought in the state II;
TS3B: BA+1 stored in PNTB;
TS4B: Now C2B=1 indicating that DPTC1 has priority;
(5) Channel 18
TS2B: FSM is brought in the state IV because C1B=CLIB=being 1 due to DPTC∅ applying a ground to CLB.
· (6) Channel 19, 20, . . . ∅, 0, 00, 16

The address BA+1 stored in PNTB is each time writt in L so that both L and PNTB store BA+1.

(7) Channel 17
  TS0B: $\overline{SSB}=1$ and FRB=1;
  TS1B: BA+1 is written in PNTB;
  TS2B: FSM is brought in state II because C2B=C1B=$\overline{CLIB}$=1;
  TS3B: PNTB is incremented by 1 so that it stores BA+2;
  TS4B: C1B=∅;
  TS5B: C2B=∅;

(8) Channel 18
  TS2B: FSM is brought in state II because C1B=$\overline{CLIB}$=1 $\overline{CLIB}$=1 because none of the DPTC∅/31 has MMI data to be transmitted;
  TS3B: BA+3 is stored in PNTB;
  TS4B: C1B=∅;
  TS5B: C2B=∅.

(9) Channels 19,20, ..., 16
  TS2B: FSM remains in the state II because C2B=C1B=$\overline{CLIB}$=1;
  TS3B: the contents of PNTB are made equal to BA+4, BA+5, etc. BA+1;
  TS4B: the contents BA+1 of L and BA+4, ... BA+1 of PNTB are compared so that C1B=∅, .. . C1B=1;
  TS5B: C2B=1 because the identity of DPTC1 is equal to BA+1.

(10) Channel 16
  TS2B: FSM is brought in state ∅ because C1B=$\overline{CLIB}$=1. To be noted that the packet length counter PLC is stepped at the occurrence of each CH17B signal and that when this counter has reached its maximum value the output POB thereof is activated. When this is the case, FSM is brought during a time slot TS2 of a channel in the state VI in the following conditions:

for states II and III: when C1B.CLIB.POB=1 i.e. when also all DPTCs have been scanned (C1B=1) and when there is still at least one DPTC wanting to sent MMI data (CLIB=1). For state III a MYTURNB signal is supplied to CH16PR, for states IV and V when FRB.POB=1 i.e. when also FRB=1.

For state V a MYTURNB signal is applied to CH16PR.

Finally, FSM is brought from state VI into the idle state when the signal FRB is activated and in the case a signal EOPSCANB, shortened ESB, is generated. This signal is also generated when FSM goes to state ∅ from state II or III.

In connection with the state diagram it should be noted that in the state III thereof C2B=∅ so that to transfer the FSM into state III this condition has not to be checked.

While the principles of the invention have been described above in connection with specific apparatus, it is to be clearly understood that this description is made only by way of example and not as a limitation on the scope of the invention.

We claim:

1. A telecommunication switching system, comprising:
  a plurality of terminal circuits providing control data;
  a common control circuit including first means for processing control data collected from said terminal circuits;
  first time division multiplex links coupling said terminal circuits with said common control circuit;
  a processor controlled interface circuit;
  second time division multiplex links coupling said processor controlled interface circuit with said common control circuit; and
  a switching network coupled to said processor controlled interface circuit, said common control circuit also including second means for transmitting said processed control data to said interface circuit on said second time division multiplex links, whereby said common control circuit is adapted to control said terminal circuits and to exchange control data between said terminal circuits and said interface circuit.

2. A telecommunication switching system, as described in claim 1, wherein said processor controlled interface circuit comprises first and second processor controlled interface circuits each coupled to said switching network and said second time division multiplex links include first and sets of time division multiplex links, said first set coupling said first processor controlled interface circuit to said common control circuit and said set coupling said second processor controlled interface circuit to said common control circuit, said second means transmitting said processed control data to selected processor controlled interface circuits.

3. A telecommunication switching system as described in claim 2, additionally comprising a plurality of common control circuits, each common control circuit being coupled to both of said first and second processor controlled interface circuits by said first and second sets of time division multiplex links.

4. A telecommunication switching system, comprising:
  a plurality of terminal circuits providing control data relating to the condition of said terminal circuits;
  a common control circuit including first mean for processing said control data relating to the condition of said terminal circuits by detecting changes in said condition;
  first time division multiplex links coupling said terminal circuits with said common control circuit;
  a processor controlled interface circuit;
  second time division multiplex links coupling said processor controlled interface circuit with said common control circuit; and
  a switching network coupled to said processor controlled interface circuit, said common control circuit also including second means for transmitting said processed control data relating to the condition of said terminal circuits to said interface circuit on said second time division multiplex links only when a change of condition has been detected, whereby said common control circuit is adapted to control said terminal circuits and to exchange control data between said terminal circuits and said interface circuit.

5. A telecommunication switching system, comprising:
  a plurality of terminal circuits;
  a common control circuit;
  a processor controlled interface circuit;
  a switching network coupled to said processor controlled interface circuit;
  first time division multiplex input and output links coupling said common cntrol circuit and said processor controlled interface circuit; and
  second time division multiplex input and output links coupling said common control circuit and said terminal circuits, said first and second time division multiplex input and output links having a plurality first and second input and output time channels respectively, said common control circuit permanently allocating a plurality of second output time channels to each of said terminal circuit, and said common control circuit including channel assignment means for assigning to a first input time channel, which was previously assigned to a terminal circuit, the second output time channel of said plurality permanently allocated to said terminal circuit which follows most closely said first input time channel when considered in time.

6. A telecommunication switching system, comprising:
   a plurality of terminal circuits;
   a common control circuit:
   a processor controlled interface circuit;
   a switching network coupled to said processor controlled interface circuit;
   first time division multiplex input and output links coupling said common control circuit and said processor controlled interface circuit; and
   second time division multiplex input and output links coupling said common control circuit and said terminal circuits, said first and second time division multiplex input and output links having a plurality of first and second input and output time channels respectively, said common control circuit permanently allocating a plurality of second output time channels to each of said terminal circuits, and said common control circuit including channel assignment means for assigning to a first input time channel, which was previously assigned to a terminal circuit, the second output time channel of said plurality permanently allocated to said terminal circuit which follows most closely said first input time channel when considered in time, said common control circuit further assigning said terminal circuit a second input time channel which is time coincident with said second output time channel, as well as a first output time channel which is at a time delay from said first input time channel substantially equal to a number of time channels equal to said plurality of terminal circuits.

7. A telecommunication switching system, comprising:
   a plurality of terminal circuits;
   a common control circuit;
   a processor controlled interface circuit;
   a switching network coupled to said processor controlled interface circuit;
   first time division multiplex input and output links coupling said common control circuit and said processor controlled interface circuit; and
   second time division multiplex input and output links coupling said common control circuit and said terminal circuits, said first and second time division multiplex input and output links having a plurality of first and second input and output time channels respectively, said common control circuit permanently allocating a plurality of second output time channels to each of said terminal circuits, and said common control circuit including channel assignment means for assigning to a first input time channel, which was previously assigned to a terminal circuit, the second output time channel of said plurality permanently allocated to said terminal circuit which follows most closely said first input time channel when considered in time, said channel assignment means including first means for determining the second output time channel coinciding in time substantially with said first input time channel previously assigned to said terminal circuit and second means for determining the one of said second output time channels most closely following this coinciding second output time channel.

8. A telecommunication switching system, comprising:
   a plurality of terminal circuits;
   a common control circuit;
   a processor controlled interface circuit;
   a switching network coupled to said processor controlled interface circuit;
   first time division multiplex input and output links coupling said common control circuit and said processor controlled interface circuit; and
   second time division multiplex input and output links coupling said common control circuit and said terminal circuits, said first and second time division multiplex input and output links having a plurality of first and second input and output time channels respectively, said common control circuit permanently allocating a plurality of second output time channels to each of said terminal circuits, and said common control circuit including channel assignment means for assigning to a first input time channel, which was previously assigned to a terminal circuit, the second output time channel of said plurality permanently allocated to said terminal circuit which follows most closely said first input time channel when considered in time, said common control circuit including first and second memory means for storing the identities of the thus assigned first input and second output tiem channels and data transmitted in said time channels respectively.

9. A telecommunication switching system, comprising:
   a plurality terminal circuits;
   a common control circuit;
   a processor controlled interface circuit;
   a switching network coupled to said processor controlled interface circuit;
   first time division multiplex input and output links coupling said common control circuit and said processor controlled interface circuit; and
   second time division multiplex input and output links coupling said common control circuit and said terminal circuits, said first and second time division multiplex input and output links having a plurality of first and second input and output time channels respectively, said common control circuit permanently allocating a plurality of second output time channels to each of said terminal circuits, and said common control including channel assignment means for assigning to a first input time channel, which was previously assigned to a terminal circuit, the second output time channel of said plurality permanently allocated to said terminal circuit which follows most closely said first input time channel when considered in time, said common control circuit being coupled to each of a plurality of said processor controlled interface circuits via said first time division multiplex input and output links with said processor controlled interface circuits being coupled to said switching network.

10. Telecommunication switching system according to claim 1, characterized in that said control data relate to the condition of said terminal circuits.

11. Telecommunication switching system according to claim 1, characterized in that said second means are adapted to transmit said processed data during predetermined time channels on said time division multiplex links.

12. Telecommunication switching system according to claim 11, characterized in that said second means are adapted to transmit said control data concerning said terminal circuits to said interface circuit in successive ones of said predetermined time channels.

13. Telecommunication switching system according to claim 4, characterized in that said first means includes:
- a first register for storing for each of said terminal circuits a first data work containing present conditions of a plurality of characteristics of said terminal circuit;
- a second register for storing for each of said terminal circuits a second data word containing previous conditions of said characteristics of said terminal circuit;
- means for comparing corresponding conditions of said first and second data words to detect changed conditions of said characteristics of said terminal circuits;
- means for storing in a third register for each terminal circuit and for each characteristic a mismatch word including the identity of said terminal circuit; and the present condition of its associated characteristics; and
- means for storing said mismatch word in a fourth register only when said present condition is different from the previous one and that said second means are adapted to transmit the contents of said fourth register to said interface circuit.

14. Telecommunication switching system according to claim 13, characterized in that said common control circuit is coupled to at least two processor controlled interface circuits and includes at least two said fourth registers associated to respective ones of said interface circuits, said first means being adapted to store one of said mismatch words in both or one of said fourth registers depending on the associated terminal circuit being not assigned to an interface circuit or being assigned to one of said interface circuits respectively.

15. Telecommunication switching system according to claim 14, characterized in that said terminal circuit is unassigned or assigned to both or one of said interface circuits by means for status bits.

16. Telecommunication switching system according to claim 5, characterized in that said second output time channels are subdivided in p successive groups of m successive channels, the p successive channels of each group being allocated to distinct terminal circuits and in the same order.

17. Telecommunication switching system according to claim 7, characterized in that said common control circuit includes first and second counters for counting the number of said first input time channels and of said second output time channels respectively, that said first means includes third means for calculating the difference between the channel numbers indicated by said first and second counters and fourth means to calculate the algebraic sum of said difference and the number of said first input time channel previously assigned to said terminal circuit, in order to obtain said coinciding second output time channel.

18. Telecommunications switching system according to claim 7, wherein said second input time channels are subdivided in p successive groups of m successive channels, the p successive channels of each group being allocated to distinct terminal circuits and in the same order characterized in that said means are adapted to select the second output time channel among the p second output time channels, assigned to said terminal circuit, which most closely follows said coinciding second output time channel.

19. Telecommunication switching system according to claim 18, characterized in that each of m (16) terminal circuits is allocated to two (p=2) second output time channels having identities which differ from that of said terminal circuit by an additional most significant bit ∅ and 1 respectively and that said second means are adapted to calculate the difference of said coinciding second output time channel and the identity of said terminal circuit and to select the second output time channel number allocated to this terminal circuit for which the most significant bit is ∅ or 1 depending on the difference being larger or smaller than m respectively.

20. Telecommunication switching system according to claim 6 characterized in that said time delay is equal to 18 channel times.

21. Telecommunication switching system according to claim 8, characterized in that said first and second memory means each have a number of rows of storage cells associated to distinct ones of said plurality of terminal circuits each of which is allocated to two second output time channels having identities which differ from that of said terminal circuit by an additional most significant bit ∅ or 1 respectively, means for storing in a row of said first memory means associated to said terminal circuit said identity of said first input time channel and the additional most significant bit of said second output time channel, and means which are associated with said first and second memory means and which in response to the identity of said first input time channel or of said second output time channel stored in a row of said first memory means activate a read-write input of the corresponding row of said second memory means.

22. Telecommunication switching system according to claim 21, characterized in that each of the cells of said first memory means is associated to a comparison circuit for comparing the bit stored in this cell with a corresponding bit of an identity of a first input channel or the most significant bit of an identity of a second output channel and for issuing an activated signal when both these compared bits are equal.

23. Telecommunication switching system according to claim 22, characterized in that to each of said rows of said first memory means is associated a first gating circuit having inputs controlled by the comparison circuits associated to said cells, except the one storing said most significant bit and having an output controlling the read/write input of a corresponding row of said second memory means.

24. Telecommunication switching system according to claim 22, characterized in that to each of said rows of said first memory means is associated to a second gating circuit having inputs controlled by the bits, except the most significant bit of the identity of said second output channel and by the comparison circuit associated to the cell storing said most significant bit and having an output controlling the read/write input of a corresponding row of said second memory means.

25. Telecommunication switching system according to claim 22, characterized in that said cell is constituted by a flipflop and said comparison circuit includes two pass transistors which are controlled in a reverse way by the outputs of said flipflop, said pass transistors having data inputs controlled by a bit of said identity and to complement thereof and having commoned outputs constituting the output of said comparison circuit.

* * * * *